US008468198B2

(12) United States Patent
Tomkow

(10) Patent No.: US 8,468,198 B2
(45) Date of Patent: *Jun. 18, 2013

(54) SYSTEM AND METHOD FOR VERIFYING DELIVERY AND INTEGRITY OF ELECTRONIC MESSAGES

(75) Inventor: Terrance A. Tomkow, Los Angeles, CA (US)

(73) Assignee: RPost International Limited, Pembroke, Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 13/448,305

(22) Filed: Apr. 16, 2012

(65) Prior Publication Data
US 2012/0265829 A1 Oct. 18, 2012

Related U.S. Application Data

(63) Continuation of application No. 12/838,340, filed on Jul. 16, 2010, now Pat. No. 8,161,104, which is a continuation of application No. 09/626,577, filed on Jul. 27, 2000, now Pat. No. 7,966,372.

(60) Provisional application No. 60/146,074, filed on Jul. 28, 1999, provisional application No. 60/172,479, filed on Dec. 17, 1999.

(51) Int. Cl.
G06F 15/16 (2006.01)

(52) U.S. Cl.
USPC ............................. 709/203; 709/206; 709/229

(58) Field of Classification Search
USPC .......................................... 709/203, 206, 229
See application file for complete search history.

(56) References Cited

U.S. PATENT DOCUMENTS

| 4,933,969 | A | 6/1990 | Marshall et al. |
| 5,530,757 | A | 6/1996 | Krawczyk |
| 5,553,145 | A | 9/1996 | Micali |
| 5,606,609 | A | 2/1997 | Houser et al. |
| 5,615,268 | A | 3/1997 | Bisbee et al. |
| 5,661,805 | A | 8/1997 | Miyauchi |
| 5,673,316 | A | 9/1997 | Auerbach et al. |
| 5,748,738 | A | 5/1998 | Bisbee et al. |
| 5,781,629 | A | 7/1998 | Haber et al. |

(Continued)

FOREIGN PATENT DOCUMENTS
| WO | 96/38987 | 12/1996 |
| WO | 98/17042 | 4/1998 |

(Continued)

OTHER PUBLICATIONS

Giorgio Cevenini et al., "A Multiprovider, Universal, E-Mail Service for the Secure Exchange of Legally-Binding Multimedia Documents," May 2000, p. 47-50.

(Continued)

Primary Examiner — Philip B Tran
(74) Attorney, Agent, or Firm — John K. Fitzgerald; Fulwider Patton LLP

(57) ABSTRACT

The invention provides a system and method for determining when a message is received by a recipient or an agent for the recipient. A link is activated at the recipient to provide an indication that the message has been opened by the recipient. The activation of the link may cause a server remote from the recipient to take some further action.

42 Claims, 18 Drawing Sheets

U.S. PATENT DOCUMENTS

| | | | |
|---|---|---|---|
| 5,781,901 A * | 7/1998 | Kuzma | 1/1 |
| 5,872,848 A | 2/1999 | Romney et al. | |
| 5,915,024 A | 6/1999 | Kitaori et al. | |
| 5,926,550 A | 7/1999 | Davis | |
| 6,021,433 A | 2/2000 | Payne et al. | |
| 6,182,219 B1 | 1/2001 | Feldbau et al. | |
| 6,189,097 B1 | 2/2001 | Tycksen et al. | |
| 6,285,991 B1 | 9/2001 | Powar | |
| 6,327,656 B2 | 12/2001 | Zabetian | |
| 6,356,937 B1 * | 3/2002 | Montville et al. | 709/206 |
| 6,396,513 B1 | 5/2002 | Helfman et al. | |
| 6,571,334 B1 | 5/2003 | Feldbau | |
| 6,594,693 B1 | 7/2003 | Borwankar | |
| 6,611,869 B1 | 8/2003 | Eschelbeck et al. | |
| 6,618,747 B1 | 9/2003 | Flynn et al. | |
| 6,643,687 B1 | 11/2003 | Dickie et al. | |
| 6,651,166 B1 | 11/2003 | Smith et al. | |
| 6,654,779 B1 | 11/2003 | Tsuei | |
| 6,684,248 B1 | 1/2004 | Janacek et al. | |
| 6,760,752 B1 | 7/2004 | Liu et al. | |
| 6,760,760 B1 | 7/2004 | McGrane | |
| 6,986,037 B1 | 1/2006 | Assmann | |
| 7,707,624 B2 | 4/2010 | Tomkow | |

FOREIGN PATENT DOCUMENTS

| | | |
|---|---|---|
| WO | 99/08424 | 2/1999 |
| WO | 01/10090 | 2/2001 |
| WO | 02/11025 | 2/2002 |

OTHER PUBLICATIONS

K. Moore, "An Extensible Message Format for Delivery Status Notifications," Jan. 1996, p. 1-39, University of Tennessee.

Network Design Manual, "Storing and Forwarding With SMTP and Message Transfer Agents," Feb. 23, 1999, p. 1-3.

IBM Technical Disclosure Bulletin, IBM Corp., "Method for Automated Communications to Third Parties Upon Composite Acknowledgement," Feb. 1, 1994, p. 345-346, New York.

* cited by examiner

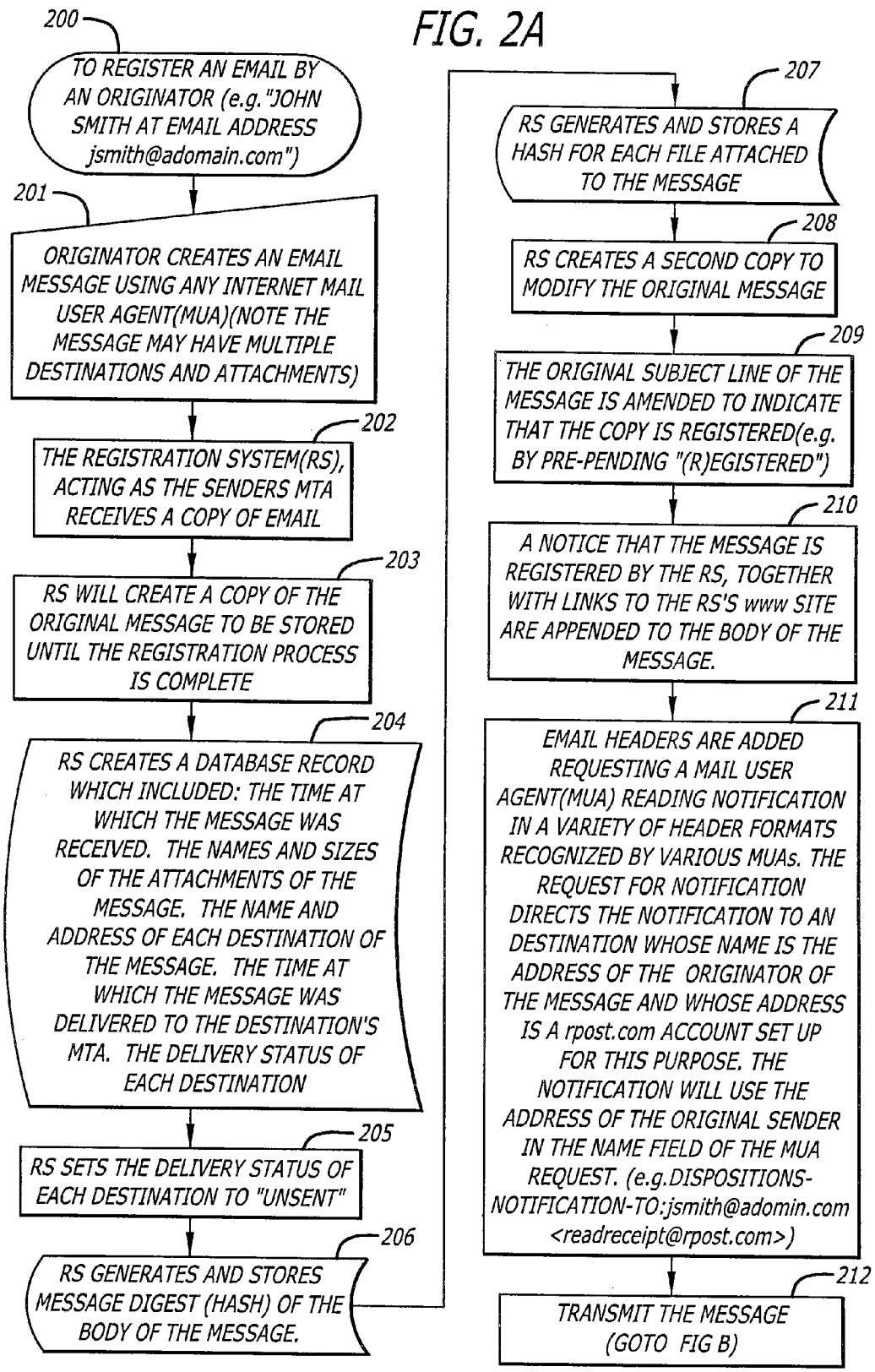

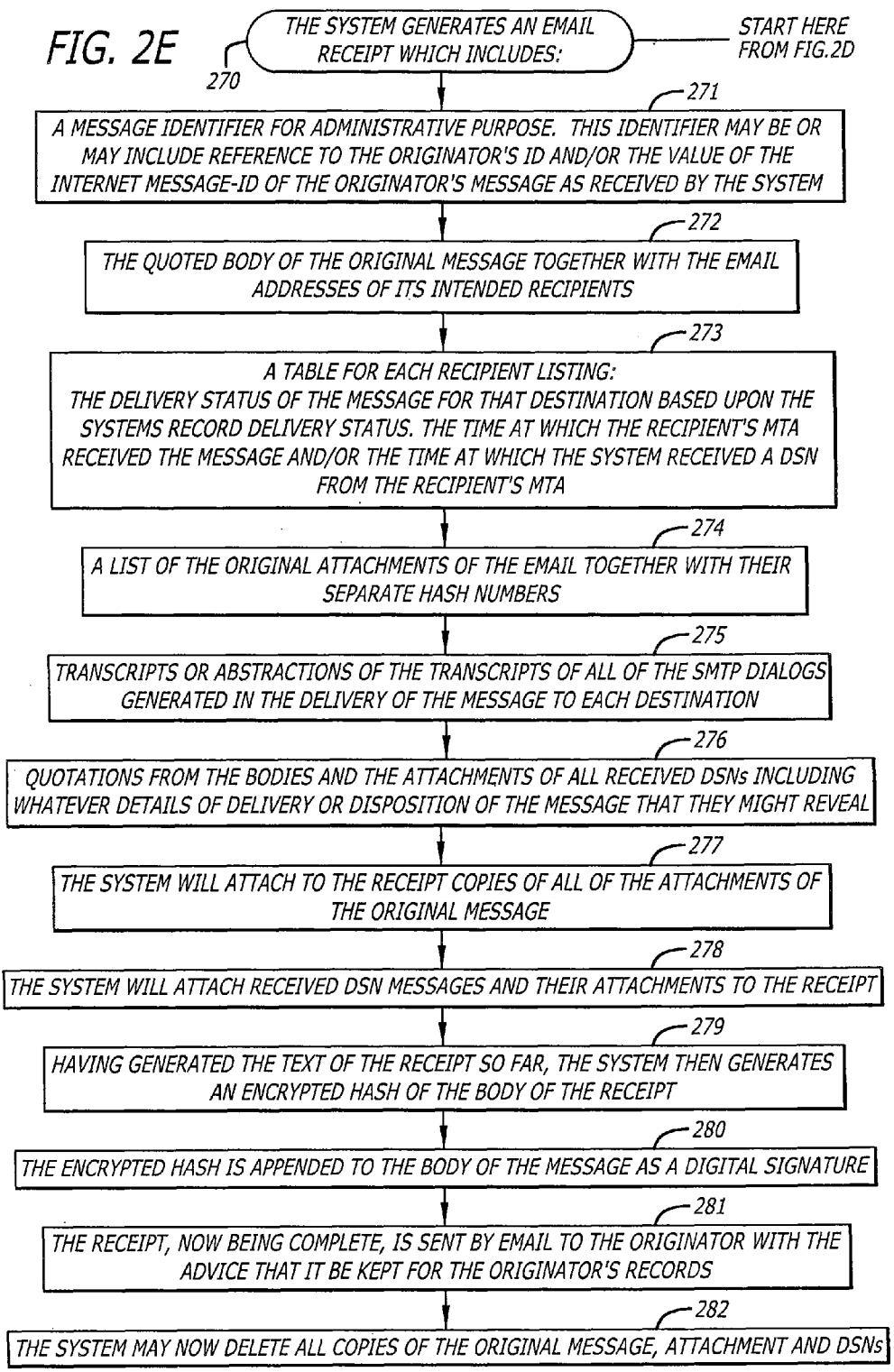

SYSTEM AND METHOD FOR VERIFYING DELIVERY AND INTEGRITY OF ELECTRONIC MESSAGES

CROSS-REFERENCES TO RELATED APPLICATIONS

This application is a continuation of U.S. application Ser. No. 12/838,340, filed Jul. 16, 2010, which is a continuation of U.S. application Ser. No. 09/626,577, filed Jul. 27, 2000, now U.S. Pat. No. 7,966,372, issued Jun. 21, 2011, which claims benefit to provisional application No. 60/146,074 filed Jul. 28, 1999; and U.S. Provisional Application No. 60/172,479 filed Dec. 17, 1999, the contents of which are hereby incorporated by reference in their entity. Applicants claim priority to all of the applications in the chain.

The subject matter of this application is related to U.S. application Ser. No. 10/722,238, filed Nov. 24, 2003.

BACKGROUND

1. Field of Invention

This invention relates generally to a system and method for verifying delivery and content of an electronic message and, more particularly, to a system and method of later providing proof regarding the delivery and content of an e-mail message.

2. Description of the Related Art

In recent years e-mail has become an indispensable business tool. E-mail has replaced "snail mail" for many business practices because it is faster, cheaper and generally more reliable. But there remain some mail applications where hard copy is still dominant, such as registered and certified mail. For example, when a letter is sent by certified mail the sender is provided with a receipt to prove that the letter was mailed. A returned registered mail receipt adds the Postal Service's confirmation that the letter was successfully delivered to the addressee or the addressee's authorized agent. Additionally, private couriers such as Federal Express® R and United Parcel Service® (UPS) provide some type of delivery confirmation. Since every piece of courier mail is, in effect, registered it is natural for consumers to turn to these services when they want proof of delivery.

Many existing e-mail systems and e-mail programs already provide for some form of proof of delivery. For instance, some e-mail systems today allow a sender to mark a message with "request for notifications" tags. Such tags allow a sender to request notification that the message was delivered and/or when the message was opened. When a sender requests delivery notification, the Internet e-mail system may provide the sender with an e mail receipt that the message was delivered to the mail server or electronic inbox of the recipient. The receipt message may include the title of the message, the destination address, and the time of delivery. It may also include (depending on the types of "flags" that are provided and activated in the mailing software) a list of all the Internet "stations" that the message passed through en route to its destination. This form of reporting is built into some of the rules and protocols which implement e-mail. Furthermore, when a message is sent with a "read notification" request, the recipient's email program may send to the sender an e-mail notification that the recipient opened that message for reading. Many electronic mail clients can and do support this kind of reporting; however. Internet protocols do not make this mandatory.

However, this does not mean that an e-mail sent with a notification request is as effective in all respects as registered mail. People certify and register letters because they want proof of delivery, e.g., proof that can be used in a civil or criminal proceeding, or proof that will satisfy a supervisor or a client or a government agency that a message has been sent, a job has been done, an order placed, or a contract requirement satisfied.

A registration receipt from the United States Postal Service (USPS) constitutes proof of delivery because the USPS stands behind it. The receipt represents the Post Office's confirmation that the letter or package in question was actually delivered to the addressee or his authorized representative. On the other hand, with the e-mail receipt various hurdles exist to an e-mail receipt being admitted and relied upon as persuasive evidence in a court of law as a proof that the message was delivered. After all, the receipt may be just another e-mail message that could have been altered or created by anyone, at any time.

There exists a need for an e-mail system and/or method that can provide reliable proof of the content and delivery of an e-mail message in order to take fuller advantage of the convenience and low cost of communicating via e-mail.

To meet this need some systems have been established whereby senders may receive third party proof of delivery by enrolling in services whereby:

a) The sender transmits an electronic message to a third party together with a list of the document's intended recipients.

b) The third party sends a notification to each of the message's intended recipients inviting them to visit the third party's web site where the message can be viewed.

c) If the intended recipient visits the third party's web site to view the message, the third party records this visit so that the sender may know that his message has been read by the recipient.

The drawbacks of such systems are manifold. In the first place they rely essentially on the co-operation of the recipient of the e-mail to collect their messages from the third party's service. But the circumstances in which a sender may want proof of delivery of a message are often ones in which it cannot be assumed that the intended recipient will co-operate in receiving the message. In such cases, e.g. where acknowledging receipt of the message would place a financial or legal burden on the recipient, the recipient can simply ignore the notification that mail is available for him to receive. Note that there is nothing in such a system to guarantee that the intended recipient has received notification of waiting mail. In the second place, such systems are cumbersome and slow to use as compared to regular e-mail insofar as it can require the sender and/or the recipient to connect to a World Wide Web site to send, collect and verify the delivery of each message. Moreover, transmission of documents by such methods may require both sender and receiver to upload and download files to a web site. Finally, because these methods require the third party to retain a copy of the whole of each message until such time as they are collected or expired, the methods can require its provider to devote substantial computational resources to data storage and data tracking over an extended period of time. As an alternative method of providing proof of delivery, some systems provide proprietary e-mail clients or web-browser plug-ins that will notify senders when a message has been received provided that a recipient uses the same e-mail client. The obvious disadvantage of such systems is that they require both sender and recipient to use the same e-mail client.

Therefore, there exists a need for an e-mail system/method that can provide reliable proof of the content and delivery of electronic messages which does not require the compliance or co-operation of the recipient, which requires no special e-mail software on the part of sender or recipient, which operates with the same or nearly the same convenience and speed of use as conventional e-mail, and which can be operated economically by a service provider.

SUMMARY OF THE INVENTION

A general object of the present invention is to provide a system and method for reliably verifying via secure and tamper-proof documentation the content and delivery of an electronic message such as an e-mail. Ideally, the invention will give e-mail and other electronic messages a legal status on a par with, if not superior to, that of registered United States mail. However, it is not necessary to the invention that any particular legal status is accorded to messages sent according to the methods taught herein, as the invention provides useful information and verification regardless.

The present invention includes an electronic message system that creates and records a digital signature of each electronic message sent through the system. An originator may send a copy of the electronic message to the system or generate the electronic message within the system itself. The system then forwards and delivers the electronic message to all recipients (or to the designated message handlers associated with the recipients), including "to" addressees and "cc" addressees. Thereafter, the system returns a receipt of delivery to the originator of the electronic message. The receipt includes, among other things: the original message, the digital signature of the message, and a handshaking and delivery history including times of delivery to the recipients. To later verify and authenticate information contained in the receipt, the originator or user sends a copy of the receipt to the system. The system then verifies that the digital signature matches the original message and the rest of the receipt. If the two match, then the system sends a letter or provides other confirmation of authenticity verifying that the electronic message has not been altered.

The system may be a form of e-mail server connected to the Internet, which can be utilized in many ways. For instance, individual users can register their electronic messages, such as e-mails, by sending a "carbon copy" (cc:) to the system or composing the message within the system itself. For corporate or e-commerce users, these users can change their server to a server incorporating the present invention and have all of their external electronic messages registered, with the option of having the system retain and archive the receipts. The system can accept and verify encrypted electronic messages and manage the electronic messages within and/or outside a "fire wall." For web-based users, i.e., individuals or corporations using web-based e-mails, such as MSN Hotmail®, or Yahoo Mail®, such users could check a box or otherwise set a flan within their e-mail programs to select on a case-by-case basis whether to register the e-mails and/or to archive the messages using the present system.

The digital signature can be created using known digital signature techniques, such as by performing a hash function on the message to produce a message digest and then encrypting the message digest. Separate digital signatures can be created for the body of the message, any attachments, and for the overall message including the body, the attachments, and the individual message digests. The encrypted message digest provides one type of message authentication or validation code, or secure documentation. Other message authentication and/or validation codes may also be generated and used.

In one aspect, the invention is a method of providing proof regarding the delivery and content of an electronic message, comprising: receiving from a sender across a computer network an electronic message, the message having a delivery address associated therewith; computing a message digest according to the message; encrypting the message digest; sending the message electronically to a destination corresponding to the delivery address; recording the Simple Mail Transport Protocol (SMTP) or Extended SMTP (ESMTP) dialog which effects the delivery of the message; receiving Delivery Status Notification information associated with the message and the delivery address; providing to the sender an electronic receipt, the receipt comprising: a copy of the message, the encrypted message digest, the (E)SMTP transcripts, and at least a subset of the Delivery Status notification information, and, at a future date, receiving electronically the electronic receipt from the sender, verifying that the encrypted message digest corresponds to the message, and verifying that the message was received by an electronic message handler associated with the delivery address.

In another aspect, the invention is a method of verifying delivery of an electronic message, comprising: in a wide area network computer system, receiving an electronic message from a message sender for routing to a destination address; establishing communication with an electronic message server associated with the destination address, the server defining a destination server; querying the destination server to determine whether the destination server supports Delivery Status Notification (DSN) functionality; receiving a response to the query, the query and response together defining an SMTP dialog; requesting Delivery Status notification information from the destination server according to results of the SMTP dialog; transmitting the electronic message to the destination address; receiving DSN information from the destination server with respect to delivery of the electronic message; and providing to the message sender at least a portion of the SMTP dialog, and at least a portion of the DSN information.

In yet another aspect, the invention is a method of verifying content of a received electronic message, comprising: receiving the electronic message; generating a digital signature corresponding to content of the received message; providing the message and the digital signature to a designated addressee; and, at a later time, verifying that the digital signature corresponds to the message.

In accordance with still another aspect of the present invention, the method includes establishing whether a message was electronically received by a recipient, comprising: providing a message to be dispatched electronically along with a recipient's address from a sender; creating a signature associating with the message; dispatching the message electronically to the recipient's address; tracking the message to determine a final Delivery Status of the message dispatched to the recipient's address; upon receiving final Delivery Status of the message, generating a receipt, the receipt including a copy of the message, the signature, and the final Delivery Status for the message; and providing the receipt to the sender for later establishing that the message was electronically received by the recipient.

In accordance with yet another aspect of the present invention, a method is provided for proving that an electronic message sent to a recipient was read, comprising: providing an electronic message along with a recipient's address; calculating a digital signature corresponding to the electronic message; dispatching the electronic message electronically to the recipient's address; requesting a Mail User Agent (email client "reading") notification from the recipient; upon receiving the reading notification, generating a reading receipt, the reading receipt including a copy of the message, the digital signature for the corresponding electronic message, and a second digital signature for the reading receipt from the recipient; and providing the reading receipt for later verification that said message was received by the recipient.

In accordance with another aspect of the present invention, a method is provided for validating the integrity of a purported copy of an electronic message, comprising: receiving the purported electronic message copy, said purported copy including an encrypted message digest associated therewith; decrypting the message digest; generating a second message digest based on content of the purported copy; and validating the purported copy by comparing the decrypted message digest and the second message digest to determine whether the two message digests match.

In accordance with a still further aspect of the present invention, a method is provided for validating a received registered e-mail, comprising: receiving an electronic receipt, said receipt including a base message and an encrypted message digest; decrypting the encrypted message digest; generating a second message digest from the base message; and validating the e-mail if the decrypted message digest matches the second message digest.

In yet another aspect, the invention is of a website at which users can go to send and receive secure messages, with the website host acting as an independent third party which will send and receive the messages and provide secure documentation regarding the content and delivery of the messages.

The above-described objects of the present invention and other features and benefits of the present invention will become clear to those skilled in the art when read in conjunction with the following detailed description of a preferred illustrative embodiment and viewed in conjunction with the attached drawings in which like numbers refer to like parts, and the appended claims.

BRIEF DESCRIPTION OF THE DRAWINGS

Detailed description of the preferred embodiment of the invention will be made with reference to the accompanying drawings.

FIGS. 2A-2F constitute a representative flow diagram for registering an outgoing e-mail according to the embodiment of FIG. 1.

DETAILED DESCRIPTION OF THE PREFERRED EMBODIMENTS

This description is not to be taken in a limiting sense, but is made merely for the purpose of illustrating the general principles of the invention. The section titles and overall organization of the present detailed description are for the purpose of convenience only and are not intended to limit the present invention. Accordingly, the invention will be described with respect to e-mail messaging systems that use the Internet network architecture and infrastructure. It is to be understood that the particular message type and network architecture described herein is for illustration only; the invention also applies to other electronic message protocols and message types using other computer network architectures, including wired and wireless networks. For convenience of discussion, messages that are processed according to the present invention may be referred to herein as being "registered" messages. In the discussion which follows, the term "RPost" will refer in general terms to a third party entity which creates and/or operates software and/or hardware implementing the present invention, and/or acts as a disinterested third party message verifier. The term is used for convenience of exemplary discussion only, and is not to be understood as limiting the invention.

I. RPost as Outgoing Mail Server Embodiment

Figure 1:
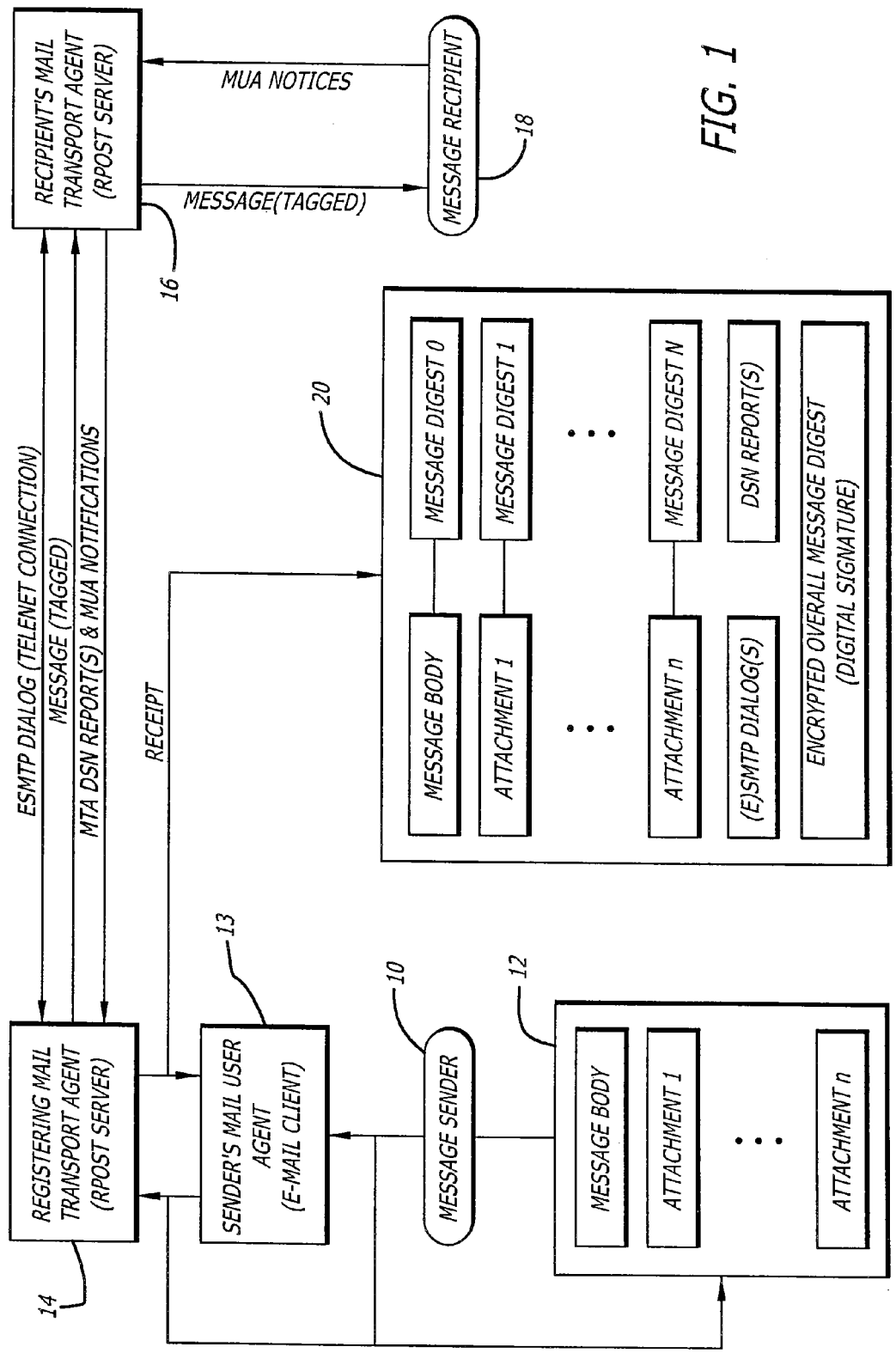
FIG. 1 is a system diagram of a first embodiment of the present invention, in which outgoing messages are registered by being transmitted by a special Mail Transport Agent (MTA).

FIG. 1 is a system diagram of a first embodiment of the present invention, wherein outgoing e-mails are registered according to the present invention. In this embodiment, the RPost registering server 14 serves as the primary outgoing Mail Transport Agent (MTA) for a message sender's Mail User Agent (MUA) 13. Although message recipient 18 is technically the addressee and is therefore merely the intended recipient or intended destination at this point in time, for simplicity of discussion this entity will be referred to herein as the recipient, addressee, or destination. Note that a single message may have many different destinations and that each of these may be reached through a different MTA.

The method of sending registered messages may divided into three parts:
1) Preprocessing: Steps to be taken before a message is transmitted;
2) Transmission: The method of delivering messages to addressees;
3) Post Processing: Procedures for gathering information about messages after their delivery, the creation of receipts, and the validation of receipts.

1.1 Preprocessing

On receiving a message for transmission, the RPost server will create records in a database for each message that will be used to store such information as:
  a) the time at which the message was received;
  b) the names of the attachments of the message;
  c) the number of addresses of the message;
For each destination of the message the database will record:
  a) the name of the destination (if available);
  b) the internet address of the destination;
  c) the time at which the message was delivered to the destination's Mail Server;

d) The Delivery Status of this destination:
Recipient Delivery Statuses used by the system will include:
UNSENT
   This status indicates that the message has not been sent.
DELIVERED-AND-WAITING-FOR-DSN
   This status indicates that the message has been delivered to an ESMTP compliant MTA that supports Delivery Status Notification (DSN) so that a success/failure notification can be expected.
DELIVERED
   This status signifies that the copy of the message sent to this recipient has been successfully delivered to a server that does not support ESMTP DSN.
DELIVERED-TO-MAILBOX
   This status signifies that a DSN message has been received which indicates that the copy of the message sent to this recipient was delivered to the mailbox of the recipient.
RELAYED
   This status signifies that an MTA DSN has been received which indicates that the copy of the message sent to this recipient has been relayed onward to another server.
UNDELIVERABLE
   This status indicates that after repeated attempts RPost has been unable to connect to an MTA to deliver the messages to this recipient.
FAILED
   This status signifies that an MTA DSN has been received that indicates a failure to deliver a copy of the message to this recipient.

At this time the system will also perform hashing functions on the message's contents.

RPost server 14 employs a hash function and an encryption algorithm. The hash function may be one of any well-known hash functions, including MD2, MD5, the Secure Hashing Algorithm (SHA), or other hash functions which may be developed in the future. Hash algorithms and methods are described in Bruce Schneider, *Applied Cryptography: Protocols, Algorithms, and Source Code* in C, John Wiley & Sons, Inc. (New York) 1993; *Federal Information Processing Standard Publication* 180-1 (TIPS PUB 180-1) *Secure Hash Standard*, National Institute of Standards and Technology; and U.S. Pat. No. 5,530,757 issued to Krawczyk, entitled "Distributed Fingerprints for Information Integrity Verification," which are hereby incorporated by reference for their teachings of hash functions, encryption, and methods and systems for implementing those functions. Other known or new methods of detecting whether the contents of the message have been altered may be used.

A good hash function H is one-way; that is, it is hard to invert where "hard to invert" means that given a hash value h, it is computationally infeasible to find some input x such that $H(x)=h$. Furthermore, the hash function should be at least weakly collision-free, which means that, given a message x, it is computationally infeasible to find some input y such that $H(x)=H(y)$. The consequence of this is that a would-be forger who knows the algorithm used and the resulting hash value or message digest will nevertheless not be able to create a counterfeit message that will hash to the same number. The hash value h returned by a hash function is generally referred to as a message digest. The message digest is sometimes referred to as a "digital fingerprint" of the message x. Currently, it is recommended that one-way hash functions produce outputs that are at least 128 bits long in order to ensure that the results are secure and not forgeable. As the current state of the art advances, the recommended length for secure hash functions may increase.

RPost server 14 computes a message digest for the message body, and a separate message digest for each of the attachments of the message and stores these in a manner in which they may be later included in a receipt for the message.

Before the message is altered in the ways that registration will require, a copy of the original message and its attachments are stored in a manner in which they can be later retrieved by the system.

The RPost server may alter a message in several ways before transmission to the recipient's MTA.

Although such is not necessary to the practice of the invention, the message may be tagged to denote the fact that the message has been registered. such as by inserting the word "'Registered" or at the beginning of the "subject" line of the message, by appending a tag such as:

"This message has been registered with RPost. Visit our web site at www.RPost.com for additional information."

at the end of the original message or other tagging. Additionally, the tag may contain instructions, World Wide Web addresses, or links that invite and allow the recipient to send a registered reply to the message by linking to a Web Page from which registered messages may be composed and sent.

Although tagging is optional, the delivered message will generally be referred to herein as the tagged message.

Internet protocols provide two forms of receipt for e-mail messages:

MTA Notifications
   These are e-mails that are sent by a recipient's MTA notifying the nominal sender of the message that various events have occurred. MTAs that conform to the SMTP protocol will typically only send a notification in the event that the mailer cannot deliver a message to the mailbox of the addressee (as might happen if the address is not valid or if the addressee's mailbox has exceeded its allotted storage quota).
   With the introduction of the Extended SMTP standard it became possible for sending MTAs to request notices of success and failure in the delivery of messages. These Delivery Status Notifications (DSNs) are e-mails which are sent by a receiving MTA to the nominal sender of the message when certain events occur: e.g. the message has been successfully deposited into the mailbox of the recipient; the message cannot be delivered to the recipient's mailbox for some reason; the recipient's message has been relayed on to another server which does not give DSN receipts.
   Note that only e-mail servers that support the Extended SMTP (ESMTP) protocol support this form of DSN and that support for this function is optional for ESMTP servers and depends on the configuration selected by the server's administrators.
   Although DSN is a term that only came into use with the advent of ESMTP, we will, in what follows, use 'DSN' to refer to any MTA generated message relating to the status of a received message whether or not it is in conformity to the ESMTP protocol.

MUA Notices (Reading Notifications)
   These are emails that are sent to the (nominal) author of a message by the recipient's Mail User Agent (MUA) (e-mail program) when certain events occur: e.g. the message is opened for reading, or deleted from the system without being read. By Internet convention (RFC 1891), no MUA program can be forced to generate such notifications. Whether an MUA will generate these receipts will depend upon the configuration chosen by its user.

The RPost server 14 will configure and transmit messages in a way that attempts to elicit both MTA DSNs and MUA notices from compliant MTAs and MUAs. In order to elicit a Reading Receipt from compliant MUAs; certain headers must be included in the header section of an e-mail message. Different MUAs respond to different headers; hence Server 14 will add several different headers to each message requesting a read notification in a form recognized by various MUAs. These headers all take the form:

Header label: user name <user address>

For example:

---

Disposition-notification-to: john smith <jsmith@adomain.com> read-notification-to: john smith <jsmith@adomain.com>

--- where 'john smith' is the name of the user to whom an MUA notification is to be sent and '<jsmith@adomain.com>' is that user's Internet address. Normally such headers would refer to the author of the message but in the case of the present method it is required that the notification be returned to RPost so that the notification can be processed by RPost. To assure that this is so Server 14 will insert headers that request that MUA receipts be sent to an address where they can be processed by the RPost server, for example: "readreceipt@RPost.com." This will direct any compliant recipient MUAs to send their notifications to an RPost address for processing.

The task of processing returned MUA notifications raises another problem that must be dealt with at this stage. There are no standards governing the format or content of MUA notifications. Often they will quote the subject of the original message and the time of the event (e.g. "opened for reading") that they are reporting. But even if this information is included in the notification it is rarely sufficient to uniquely identify the message that prompts it or to identify the author of that message. When the system receives a MUA notification it must be able to identify the message that prompts it, so as to include the notification information in the receipt that RPost will generate for the sender. Alternatively, the system must at least be able to reliably identify the sender of the message to which the MUA notification refers so that the notification information can be passed on to the sender in the form of an RPost Reading receipt (see below).

To accomplish the latter goal, the system can take advantage of the fact that internet addresses have two components: a name field and an address field, where the address field is set off by corner quotes "< >". Most MUAs will include both fields in the destination address of their MUA notifications. In composing its requests for MUA receipts, the RPost system will include the Server 14 read receipt-handling address as the address for the notification but will use the address of the original sender in the name field of the header. For example, where the original sender of the message is user John Smith with Internet address jsmith@adomain.com, the RPost server will include headers of the form:

Disposition-notification-to: jsmith@adomain.com readreceipts@RPost.com>

This will typically result in the compliant MUA sending a notification to readreceipts@RPost.com addressed as:

jsmith@adomain.com <readreceipts@RPost.com>

On receipt of such a notification at the address "readreceipts@RPost.com," the server can, by parsing the addressee's field; determine that the notification concerns a message originally sent by jsmith@adomain.com, even if this could not be determined by any examination of the contents of the notification. With this information in hand, the server can then package the contents of the notification in a digitally signed RPost Reading receipt and send the receipt to the address jsmith@domain.com.

The RPost system will also endeavor to elicit and collect MTA DSN notices generated by recipient MTAs. Since such notifications are always sent to the address listed in the "FROM:" field of the message header, server 14 must alter each message header so that the message is received as '*FROM:" an RPost address at which DSNs may be processed.

However the problem of processing DSNs raises another issue, which must be dealt with at this stage. DSNs do not have any standard content or format; often it is impossible to determine, merely by examining the contents of these e-mails, what message their contents are giving notification of This problem was supposed to have been addressed for DSNs generated in compliance with the ESMTP protocol by the use of DSN envelope ID numbers (see RFC 1869). According to the protocol, a transmitting MTA can include a reference number along with its request for a DSN. This number would be quoted in any returning DSN, allowing the sender to identify the subject message of the DSN. However, as a matter of fact, many MTAs that report themselves as supporting ESMTP DSN do not return a DSN envelope ID or any other information sufficient to reliably identify the subject message. Finally, even where a DSN does return information sufficient to identify the message it is giving notice of, it often will not contain sufficient information to identify the specific addressee of the message that has prompted the notification. Thus, a single message might be sent to two addressees at a domain; one might be successfully delivered to the addressee's mailbox; the other, not. The MTA for the domain may report these events in a DSN in ways that provide no way for the recipient of the DSN to determine which addressee was successfully delivered and which was not (as, for example, may happen if the DSN reports the recipient's addresses as their local alias names rather than by the addresses contained in the original message).

The present invention solves this problem in four steps:
1) A unique identification number is generated for each outgoing message (e.g. based upon a time stamp). This number is stored in a database.
2) The recipients of each message are enumerated and the identifying numbers are stored in a database.
3) The message is sent separately to each intended recipient's MTA. (Even when two recipients have a common domain name and MTA, the server will transmit the message to that MTA in two separate SMTP telnet sessions.)
4) When Server 14 transmits the message to a recipient's MTA it augments the message's "FROM" field to show the message as having been sent from an address which incorporates the message's unique ID and the identifying number of the sender. The address also contains a substring (e.g. "rcpt"') that enables the Server to identify return messages as DSNs.

Thus, a single message denominated "mmyyddss" by Server 14, from the sender named John Smith, might be sent to its first intended recipient (denominated "a" by the system) with a header reading:

From: John Smith <rcptmmddyyssa@RPost.com>

The same message would be sent to the second recipient with a header reading:

From: John Smith <rcptmmddyyssb@RPost.com>

Many e-mail MUAs will only display the name of the sender of a message and thus the special address will be unseen by most recipients.

The upshot of this form of addressing is that when the recipient MTAs issue DSNs (whether ESMTP compliant or not) they will address those DSNs to different RPost addressees. On receiving these DSNs, Server 14 can identify them as DSN messages by their "RCPT" prefix and, by parsing the addressees, can determine which message and which recipient is the subject of the DSN.

System 14 will alter the 'FROM' field of each message to refer to a recipient of the message each time it attempts to transmit the message to that recipient's MTA.

To insure that recipient replies to transmitted messages are directed properly system 14 will add an explicit "reply-to:" message header into the message listing the original sender's name and Internet address. In the case of the present example this would be:

Reply-to: john smith <jsmith@adomain.com>
This will lead recipient MUAs to address replies to a received message to the actual sender's address, rather than the constructed RPost address.

1.2 Transmission

As noted above, it is part of the method that the RPost server transmits a separate copy of an outgoing message to each addressee of that message. Moreover RPost will attempt to make each such delivery through a direct SMTP connection with a mail eXchanger (MX) of record for each destination.

Note: Each valid Internet e-mail address includes an Internet domain name or IP address. Each domain name/address has associated with it an e-mail server(s) authorized to receive mail for addresses in that domain. It will be noted that some domains have more than one server. The Domain Name Server responsible for each domain broadcasts the identity of its mail servers across the Internet. This information is publicly available and is managed and transmitted in ways that conform to rules and conventions which govern Internet e-mail and Domain Name service.

Before transmitting a copy of a message to any destination the RPost server will perform an Internet Name Server Lookup to identify an MTA associated with the destination's domain. Having identified the MTA responsible for receiving mail on behalf of a destination address, the system will attempt to open a telnet connection with the destination's local MTA.

It is common practice for Internet e-mails to be relayed from MTA to MTA until they reach their final destination. The primary purpose for requiring a direct connection between the RPost server and the destination's MTA is so that the RPost server can record delivery of the message, (this record taking the form of an SMTP dialogue) with the e-mail server which has proprietary responsibility for receiving e-mail for the recipient domain name.

The existence of this record provides helpful evidence that the message was delivered, in much the same way that a registered mail receipt provides evidence of delivery. USPS Registered mail is treated as verifiably delivered if it can be proved to have been delivered to the addressee's authorized agent (e.g. a secretary, or mail room clerk). In the event of any legal challenge to the evidentiary merit of an RPost delivery receipt, it will be recognized that in selecting an Internet e-mail service provider, the recipient has authorized that provider to collect electronic messages on his behalf. In turn, that service provider has acknowledged its status as the authorized agent for e-mail recipients of that domain name by broadcasting the address of its MTAs as the receptive e-mail servers for this domain.

Accordingly, having delivered messages directly to the mail server responsible for receiving the recipient's e-mail, RPost will have delivered the message to an agent the recipient has legally authorized to receive his mail. By recording the delivery transaction (that transaction taking the form of an SMTP dialogue) RPost can claim to have proof of delivery to the recipient's authorized agent.

Note that while the method herein described attempts to collect other forms of proof of delivery to each destination, whether or not these attempts succeed will depend upon factors that. will not be in control of RPost, (e.g. the form of SMTP support deployed on the recipient's mail server). On the other hand, every successful delivery direct to a recipient's mail server will always generate an SMTP record. Recording this record allows RPost to provide proof of delivery to any valid Internet destination that complies with the minimum protocols (SMTP) for Internet mail. This represents an important advantage of the current method over other methods that might attempt to prove delivery by reliance on ESMTP DSN.

Having identified the MTA for a destination of a message, the RPost server will attempt to open an ESMTP connection with the destination MTA by issuing an "EHLO" handshake in compliance with RFC 1869. If SERVER 16 supports ESMTP, it will respond by listing which ESMTP services it supports.

If SERVER 16 supports ESMTP, the RPost server will first determine if SERVER 16 supports the ESMTP Service "VERIFY". The Verify service allows a calling SMTP server to determine, among other things, if an address in an MTA's domain is genuine. If the RPost Server determines by these means that the address it is attempting to deliver its message to is not valid, it will terminate the connection, cease attempting to deliver a message to this addressee, and record, in its database, the status of this message destination as UNDELIVERABLE.

Whatever its result, the RPost Server will record the ESMTP VERIFY dialogue in a file and store it so that it may be later attached to or included in the Delivery Receipt for this message. It should be noted that, out of concern for security, few ESMTP servers support the VERIFY function.

If System 16 does not support the VERIFY method, then the RPost server will nevertheless attempt to deliver the message to System 16. Typically an MTA will accept messages for any address nominally in its domain and will later send a DSN if the address is invalid.

The RPost server will then attempt to determine if the destination server supports the ESMTP service DSN. If it does, RPost will transmit the message with a request that SERVER 16 notify the sender of the message with an ESMTP DSN if the delivery to the addressee succeeds or fails. After the successful transmission of the message to this destination the system will record the Delivery Status of this destination as DELIVERED-WAITING-FOR-DSN.

If Server 16 replies to the "EHLO" handshake in a way that indicates that it does not support ESMTP, the RPost server will issue a "HELO" message to initiate an SMTP connection. If this connection is achieved, the RPost server will transmit the message in compliance with the SMTP protocol and will record the Delivery Status of the destination as DELIVERED.

Whether the connection is SMTP or ESMTP, the RPost server will record the entire protocol dialogue between the two servers. Typically this dialogue will include protocol messages in which, among other things, the destination server identifies itself, grants permission to upload a message for a named recipient, and acknowledges that the message was received. RPost will save the record of this transaction in such way that it may be later retrieved and included in or attached to the RPost Delivery Receipt for this message.

For various reasons RPost may not be able to achieve an SMTP connection with MTA of a recipient or it may achieve such a connection but be denied permission to transmit the message by the recipient. In that case, if the Internet DNS lookup reveals that the destination address is served by multiple MTAs, the RPost server will attempt to deliver its message to each of these in turn. RPost will continue to attempt to deliver to an appropriate MTA as often as system resources permit. If, after a length of time, RPost cannot deliver the message to an address; it will mark the status of this recipient of this message as "UNDELIVERABLE" and stop attempting to send this message to this destination address.

When the RPost server succeeds in transmitting a message to a destination Server that explicitly supports ESMTP DSN, RPost will record the status of this recipient for this message as "DELIVERED-AND-WAITING-FOR-DSN".

When the RPost server succeeds in transmitting a message to the destination Server via a connection that does not explicitly support ESMTP DSN, RPost will record the status of this recipient for this message as "DELIVERED."

I.3. Postprocessing

DSN Processing

MTA DSNs will be returned to the RPost Server addressed to fictitious addresses in its proprietary domain (e.g. "RPost.com"), these addresses having been constructed as described above. The RPost server will scan all inbound mail addressed to the domain and detect DSN messages by their identifying substring (e.g. "rcpt"). By parsing these addresses in the manner described above, the system can identify the message and the recipient that has prompted the DSN notification.

There is no standard format for DSN messages; neither is there any standard lexicon in which they report their results. To evaluate a received DSN the system must look in the subject line and the body of DSN messages for words and phrases that express the DSN's meaning For example, such phrases as "successful delivery" or "delivered to mailbox" or "was delivered" normally signal that the message the DSN concerns was deposited to the mailbox of the destination. When it detects such phrases the System will change the Delivery Status of this destination of the message to "DELIVERED TO MAILBOX".

Phrases such as "could not be delivered", "fatal error", "failure" and "unsuccessful" typically signal a DSN that reports a failure by the MTA to deliver the message to the destination. When it detects phrases such as these in the DSN the system will change the record of the recipient's Delivery Status to "FAILED".

Though the system always delivers mail to a proprietary MTA for the destination's domain, these MTAs will sometimes relay the message to a different server (as may be the case, for example; if the receiving MTA sends mail behind a firewall). In this case the DSN will contain such phrases as "relayed" or "relayed onward". In such cases the system will change the recipient's Delivery Status to "RELAYED".

Having evaluated the DSN and updated the recipient's Delivery Status accordingly, the system will save the DSN and any attachments it may contain in such a way that this message(s) may be included in and/or attached to an RPost Delivery Receipt.

Message Management

From time to time the system will scan each sent message and examine the status of each destination of that message in order to determine if the system has completed processing of that destination's delivery. The criteria for completion depend upon the destination's Delivery Status:

DELIVERED: This status indicates that a copy of the message for this recipient has been delivered to an MTA that does not support ESMTP DSN. Such an MTA may nevertheless send a form of Delivery Status Notification in the event that the message could not be delivered to the Mailbox of the addressee (as might happen, for example, if the destination address does not correspond to a valid account within the domain). Accordingly, the system will not treat the delivery for such a recipient as completed until a period of time has elapsed since the delivery to the recipient MTA. This time period-typically two to twenty four hours—represents an estimate of the maximum time required for a majority of servers to return a notification of a failure to deliver and it may be adjusted if the specific destination domain is remote or known to be prompt or tardy in producing such notifications.

RELAYED: This status signifies that a DSN has been received that indicates that the recipient MTA has forwarded the message to another MTA that does not support ESMTP DSN. In this case it is nevertheless possible that the MTA to which the message has been delivered will send a notification of failure to deliver in due course. Accordingly recipients with this status are treated as complete under the same conditions as recipients with the status DELIVERED.

DELIVERED-AND-WAITING-FOR-DSN: This status indicates that the recipient's MTA supports ESMTP DSN and that a DSN has been solicited but not yet received. It may sometimes happen that although an MTA identifies itself as supporting this service it will nevertheless not provide DSNs even in the event of successful delivery. Accordingly, the system will regard deliveries to a destination with this status as completed even if no DSN is received after an interval of time. This interval—typically six to twenty-four hours—represents an estimate of the maximum time typically required for a compliant MTA to return a DSN.

DELIVERED-TO-MAILBOX: This status indicates that a DSN indicating successful delivery has been received for this recipient and hence the delivery of the message to this destination is completed.

FAILED, UNDELIVERABLE: Deliveries to recipients with this status are always treated as complete.

When the system finds that delivery to all recipients of a message has been completed the system will construct a Delivery Receipt for the message.

Creation of Delivery Receipts

Delivery receipts are e-mails sent to the original sender of the Registered message. The receipt 20 may contain:

1. an identifier for administrative purposes. This identifier may be or may include reference to the sender's ID and/or the value of the Internet Message-ID of the sender's message as received by the system;
2. the date and time at which the receipt was generated;
3. the quoted body of the original message together with the e-mail addresses of its intended recipients;
4. the date and time at which the RPost Server received the message;

5. a table for each destination listing:
   (i) the time at which the recipient's MTA received the message and/or the time at which the system received a DSN report from the recipient's MTA;
   (ii) a Delivery Status of the message for that destination. The Delivery Status quoted in a Delivery Receipt is based upon the system's internal record of the destination's Delivery Status. They may be transcribed as follows:
      Deliveries to destinations whose status is FAILED or UNDELIVERABLE will be recorded in the receipt as "failed".
      Deliveries to destinations whose status is DELIVERED or DELIVERED-AND-WAITING-FOR DSN will be recorded in the receipt as "delivered to mail server".
      Deliveries to recipients whose status is DELIVERED TO-MAILBOX will be recorded in the receipt as "delivered to mail box".
      The purpose of these reports is to accurately apprise the reader of the form of verification of delivery the system has been able to achieve.
6. a list of the original attachments of the e-mail together with the separate message digests of those attachments;
7. copies of the attachments to the original message, each original attachment being attached as an attachment to the receipt;
8. transcripts, summaries, or abstractions of the transcripts of all of the SMTP dialogs involved in the delivery of the message to each destination;
9. quotations from the bodies and the attachments of all received DSN reports including whatever details of delivery or disposition of the message that they might reveal; and
10. any files that were returned to the system as attachments to DSN reports.

All of these separate elements of the receipt may have their own message digests or digital signatures included within the receipt. Additionally, the receipt may include a single overall encrypted message digest or digital signature computed and appended as part of the receipt, thus providing a single message authentication code which could be used to authenticate all of the information contained within the receipt. Since the receipt itself and SMTP dialogs and DSN reports within the receipt contain timestamps, the receipt includes a non-forgeable record of the message recipient(s), the message content, and the time(s) and route(s) of delivery.

MUA Notification Processing

MUA Notifications could be collected and incorporated within RPost Delivery receipts in the same manner as MTA DSNs. However, MTA notifications are typically issued by receiving MTAs within a few hours of delivery whereas MUA Notifications will not be generated, if ever, until the recipient opens his MUA e-mail client and takes some action with respect to the received mail. For this reason, in this embodiment of the invention MUA notifications are collected separately from MTA notifications and reported in "RPost Reading Receipts" separate from RPost Delivery Receipts.

MUA notifications elicited by message headers constructed in the manner described above will be returned to a common RPost address (e.g. "readreceipts@RPost.com") and each notification will contain—in the name field of its address—the address of the original sender of this message. Because this is the only information required to generate an RPost reading receipt in the manner described below, the system can deal with MUA notices whenever these notices may arrive and without any need to have stored any information about the original message in its databanks.

MUA notices may report, among other things, that a message has been read by a recipient, that a message has been displayed on the recipient's terminal (whether or not read), that a message has been deleted without having been opened. There is no protocol-governed standard for the content or format of MUA messages. The system could be configured so as to examine the text of MUAs to interpret their reports in the same fashion as the system uses for MTA DSNs. However, in the current embodiment of the invention, MUAs are not evaluated or interpreted by the RPost server but are, instead, passed on to the sender for his own evaluation in a form that can be authenticated by RPost. To accomplish this the system will create an e-mail message styled as an "R-Post Reading Notice'" which may include, among other items:

1. subject line of the received MUA notice;
2. the body of the received MUA notice quoted as the body of the Reading Notice;
3. the received MUA notice included as an attachment;
4. any attachment(s) to the received MUA notice included as an attachment(s).
5. message digests of the received MUA notice and of any attachment(s) to that notice;
6. a date and time stamp;
7. an encrypted hash of at least items 5 and 6 providing an authenticatible date stamped digital signature for the document and all of its contents.

Receipt Disposition

In the case of the current embodiment of the invention, both RPost delivery receipts and Reading Notices are sent to the original sender of the registered message. Since these receipts are digitally signed with an encrypted hash, RPost can authenticate the information contained in these messages any time they are presented to RPost for this purpose, in the manner described below. This means that once it has transmitted a copy of the receipt to its sender (with instructions to the sender to retain the receipt for his records), RPost has no further need to retain any data concerning the message or its delivery and may expunge all such records from its system. Thus, RPost need not keep any copy of the original message or the receipt. This economy of archival memory gives the present invention an advantage over various prior art message authentication systems that required large amounts of data storage at the service provider side.

In this case the burden of retaining receipt data falls on the original sender of the message. Alternatively or additionally, third party verifier RPost may, perhaps for an additional fee, store a permanent copy of the receipt or of some or all receipt data. The receipt or part(s) thereof may be kept on any suitable archival storage devices including magnetic tape, CD ROM, or other storage device types. Additionally or alternatively, RPost may return receipts or parts thereof to a storage system devoted to this purpose within the control of the sender or the sender's organization.

As described above, RPost receipt information includes all of the data from the original sender's message and its attachments. There are circumstances in which users of the system might not wish to undertake the burden of retaining receipts in their records (e.g., out of fear of accidental data loss) but might also not wish to have the contents of their message in the hands of the RPost third party. Accordingly RPost might discard the contents of messages but store in its database only such information (e.g. sender, date of composition, message digests, destinations and Delivery Statuses) as might be required for RPost to authenticate and verify the delivery of a message when presented with a copy of the message retained by the sender.

Verification

In the event that the originator of a message requires evidence at a later date that an e-mail was sent, delivered, and/or read, the originator presents the receipt(s) for the message to the operators of the system.

For example, in order to prove that a particular message was sent from sender 10 to recipient 18, sender 10 sends to RPost a copy of receipt 20 with a request to verify the information contained within the receipt. This could be done by sending the receipt to a predefined mailbox at RPost, e.g., verify @RPost.com. RPost then determines whether or not the receipt is a valid receipt. A receipt is a valid receipt if the digital signature matches the remainder of the receipt, and the message digests match the corresponding respective portions of the original message. Specifically, RPost performs the hash function on the various portions of the message including the message body, the attachments, and the overall message including the SMTP dialog and DSN reports, to produce one or more message digests corresponding to the purported message copy. RPost compares the message digests in the purported copy, including the overall message digest, with the message digests which RPost has computed from the purported message copy. The overall message digest can be compared by either decrypting the overall message digest received as the digital signature in the purported receipt, or by encrypting the overall message digest which was calculated from the purported message copy. If the message digests including the digital signature match, then the receipt is an authentic RPost-generated receipt. Assuming that a good hash function was used and that the keys used in the cryptographic hash function and the digital signature encryption algorithm have not been divulged to others, it is virtually impossible that the receipt has been "forged" by the person presenting the receipt. That is, the receipt must have been a receipt that was generated by RPost, and therefore the message contained in the receipt, the to/from information, the date and time of delivery, the fact of successful delivery, the route by which the message traveled, and any DSN information contained within the receipt, must be a true copy of that information and is accurate. RPost can then provide authentication, verification, and confirmation of the information contained within the receipt. This confirmation can take the form of an e-mail confirmation, affidavit testimony from RPost employees familiar with the methods used by RPost, live sworn testimony in depositions and in court, and other forms of testimony. RPost can charge sender 10, recipient 18, or any other entity, fees for the various respective confirmation services. RPost can also provide testimony or other confirmation with regard to the nonauthenticity of a purported receipt. Testimony may be provided in accordance with Federal Rules of Evidence 901(9). 901(10), 803(6), 803(7), 1001-1004, 1006, 702-706, corresponding state rules of evidence, and other applicable rules.

In sum, the system provides reliable evidence based on the testimony of a disinterested third party that a particular message having a particular content was sent, when it was sent, who sent it, who received it, when it was opened for reading, and when it was deleted. This evidence can be presented any time a dispute arises regarding the content and delivery of messages, as for example in contract formation, the timing of stock buy or sell orders, and many other applications. The operators of the system can attest to the accuracy of the information contained in the receipt itself without the need for the operators to preserve any record or copy of the information contained in the receipt.

A significant advantage of the system is that it can be used by existing MUAs without any change thereto. Because all the computation, encryption, ESMTP interrogation and dialog, DSN report collection, and receipt compilation, are performed by the third party RPost server, none of these functions need to be implemented within any of the user's equipment. Thus, users can take advantage of the system quickly and easily.

In the embodiment of the invention described above, the RPost Sever registers the delivery of all messages passing through it. Alternatively, an RPost server might register only those messages having certain destinations (e.g. external to an organization) or from certain senders (e.g. a customer relations group). Alternatively or additionally, the RPost server might register only those messages that had distinguishing characters or strings in the subject or body of the message. For example, the server might register only messages that the sender had included "(R)" in the subject of the message. All other messages might be delivered by the RPost Server or some other server function as an ordinary Internet MTA.

In this embodiment; RPost can raise revenue in a variety of ways. For instance: RPost can charge message sender 10 or her organization a fee on a per-message basis, on a per-kilobyte basis, on a flat fee periodic basis such as monthly, or on a combination of the above. RPost can also charge fees for authenticating and verifying a receipt, with a schedule of charges depending on whether the verification sought is a simple return e-mail, a written affidavit or declaration, sworn fact testimony in deposition or in court, or sworn expert testimony in deposition or in court. If the users opt to have RPost retain copies of the receipts, RPost can charge per item and/or per-kilobyte per month storage fees.

II. Flow Diagram for Registering an Outgoing Message

FIGS. 2A-2G constitute a flow chart showing an exemplary operation of the first embodiment of the system. Modifying this flow chart to apply to other embodiments is within the skill of one familiar with software and e-mail protocols.

FIG. 3A, Pre-processing, illustrates the steps taken with a message before it will be transmitted by the Registering Server (the System).

To register an e-mail message, in step 201 an originator/sender/user creates an email message using any Internet Mail User Agent (MUA). Possible MUAs include: (1) client side e-mail programs; (2) server based e-mail programs; (3) web based e-mail services; and (4) HTML forms submitted through web pages. The message may contain attached files as described in the Requests for Comments (RFCs) 822, 2046, and 2047, which are hereby incorporated by reference. RFCs are a series of notes regarding the Internet that discuss many aspects of computer communication, focusing on networking protocols, procedures, programs, and concepts.

In this embodiment, the system functions as the sender's outgoing mail server and hence the sender's message will be directly transferred to the RPost Server by the sender's MUA (step 202).

In step 203, the system creates a copy of the original message to be stored for later processing.

In step 204, the system creates a record in a database which may include such information as: the time at which the message was received by the server, the names and size(s) of the file attachment(s) of the message, the name (if known) of each destination of the message; the internet address of each destination; the time at which the message was delivered to the destination's MTA (initially this value is null) and a unit which records the Delivery Status of each destination.

In step 205, the Delivery Status of each destination is set to "UNSENT".

In step 206, the system generates and stores a message digest or digital fingerprint generated from the message body.

In step 207, the system generates and stores a hash or message digest for each attachment included in the message.

In step 208, the system may create a modified copy of the original message. In this second copy (step 209), the original subject line of the message may be amended to indicate that this copy is registered (e.g. by pre-pending "Registered").

In step 210, a notice that the message is registered by the system together with links to the system's Word Wide Web site may be appended to the body of the message.

In step 211, the e-mail headers may be added requesting reading notification in a variety of header formats recognized by various MUAs. The requests for notification direct the return notification to an address associated with the system: for example, "readreceipt@RPost.com". These headers will also include the address of the original sender of the message in the name field of the address to which the MUA notification should be sent.

Figures 1, 2B:
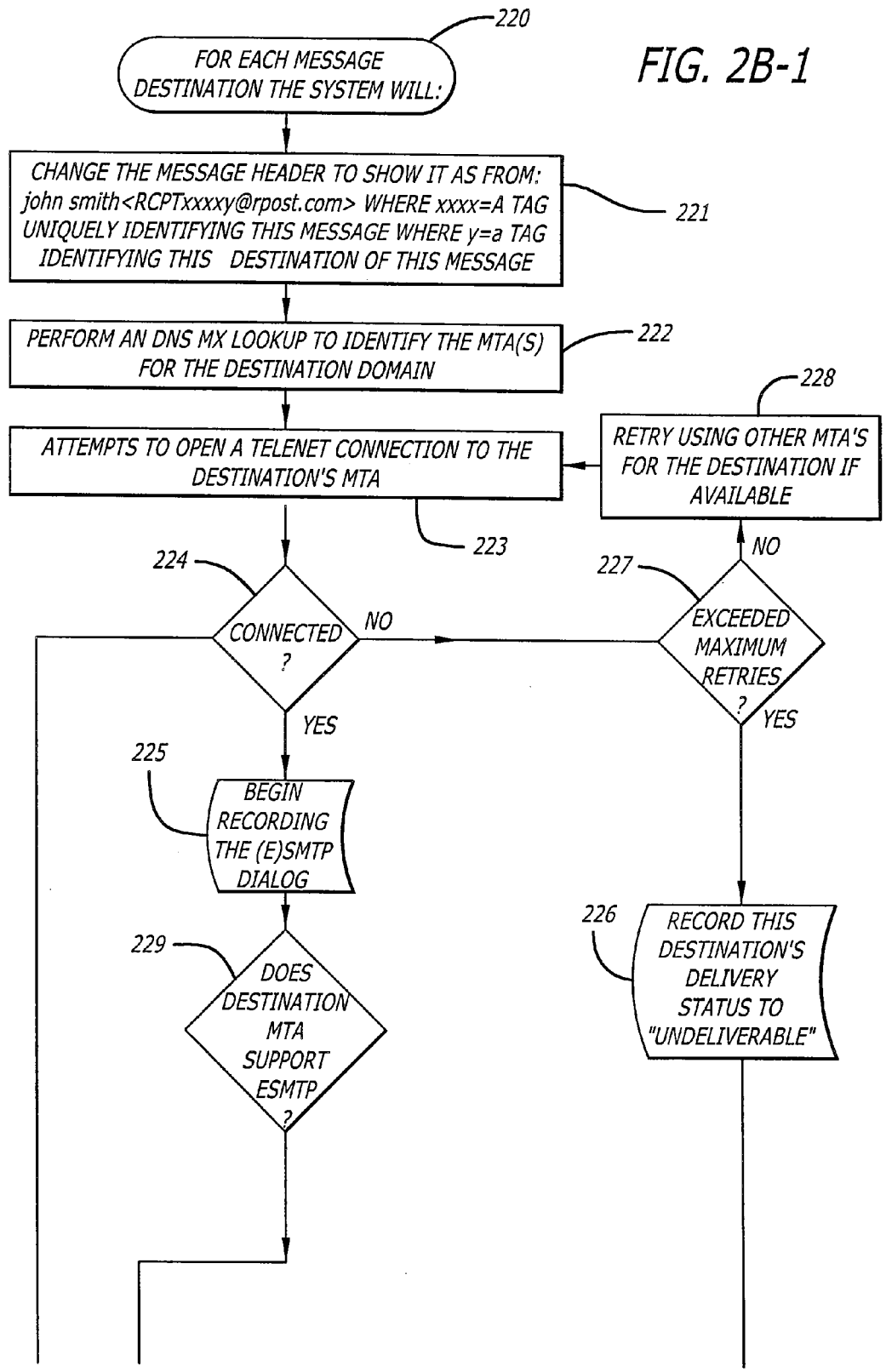
Figures 2, 2B:
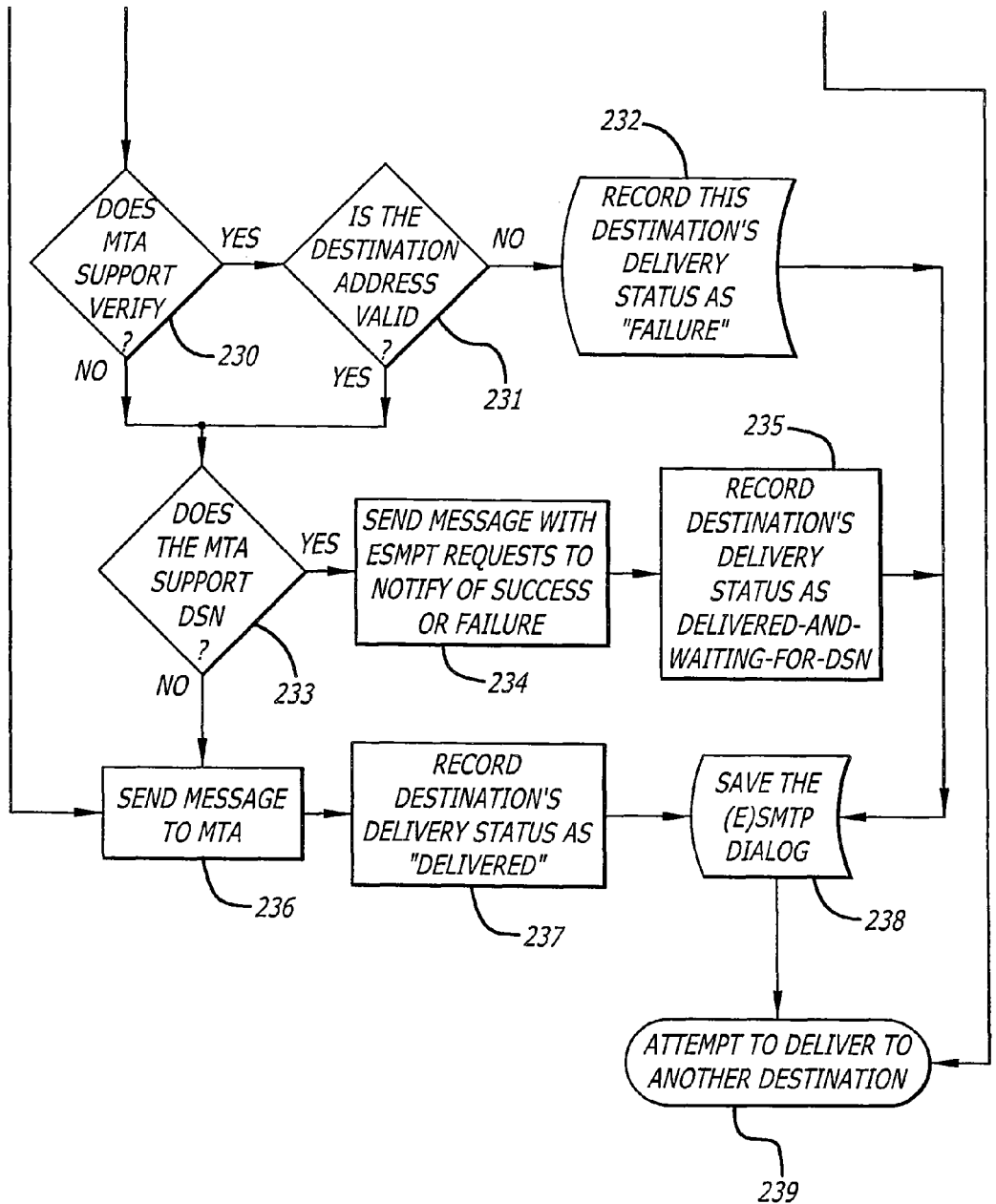

Preprocessing having been completed, the system will now transmit a copy of the message to each of its destinations as illustrated in FIG. 2B.

FIG. 2B illustrates the steps required to transmit a registered message. As step 220 indicates, the process requires a separate transmission for each recipient of the message.

In step 221, the system changes the header field of its working copy of the message to show the message as being "FROM:" a sender whose name is the original sender of the message but whose address is an "RPost.com" address constructed from:
  a) a string used to identify returning MTA notifications (e.g. "RCPT");
  b) a string which uniquely identifies the message being sent;
  c) a tag which uniquely identifies the destination this copy of the message is being sent to.

In step 222, using the domain name of the destination currently being sent to, the system does a Domain Name Server Mail exchange lookup to find the address of the MTA(s) responsible for collecting mail for addresses in this domain.

In step 223, the system attempts to make a direct telnet connection to the MTA of the destination. If the connection fails, the system will try to make the connection again. Provided that the system has not exceed a maximum number of retries (227) for this destination, the system will try to remake the connection perhaps using another MX sever for the destination's domain (228).

If, after a maximum number of retries, the system cannot connect to an MTA for this destination, the system will, as in step 226, record this destination's Delivery Status as "UNDELIVERABLE" and cease attempting to deliver this message to this destination.

On connecting to the destination's MTA, the system will begin making a record of its (E)SMTP dialog with the MTA (225).

In step 229, the system attempts to initiate an Extended SMTP (ESMTP) exchange with the destination MTA by issuing an "EHLO" greeting.

If the destination's MTS supports ESMTP, the system will then (230) determine if the destination MTA supports the SMTP function VERIFY. If the MTA supports VERIFY, the system will attempt to determine if the destination address is a valid address within the domain (231).

If the address is not valid, then, as in step 232, the system will record the Delivery Status of this destination as "FAILURE" and will cease attempting to deliver this message to this destination.

If the address is valid or if the ESMTP server does not support VERIFY, the system will then (233) determine if the receiving MTA supports the ESMTP service DSN (Delivery Status Notification).

If the MTA does support ESMTP DSN, the system will transmit the message with ESMTP requests to notify the nominal sender of the message of delivery success or failure (234). Having transmitted the message, the system will record the Delivery Status of this destination as "DELIVERED-AND-WAITING-FOR-DSN" (235).

If the receiving MTA does not support Extended SMTP, the system will transmit the message using SMTP (236) and record the destination's status as "DELIVERED" (237).

Having delivered the message, the system will then store the (E)SMTP dialog, recording the delivery in a manner in which it can later be recovered (238) and attempt to send the message to another destination.

Figure 2C:
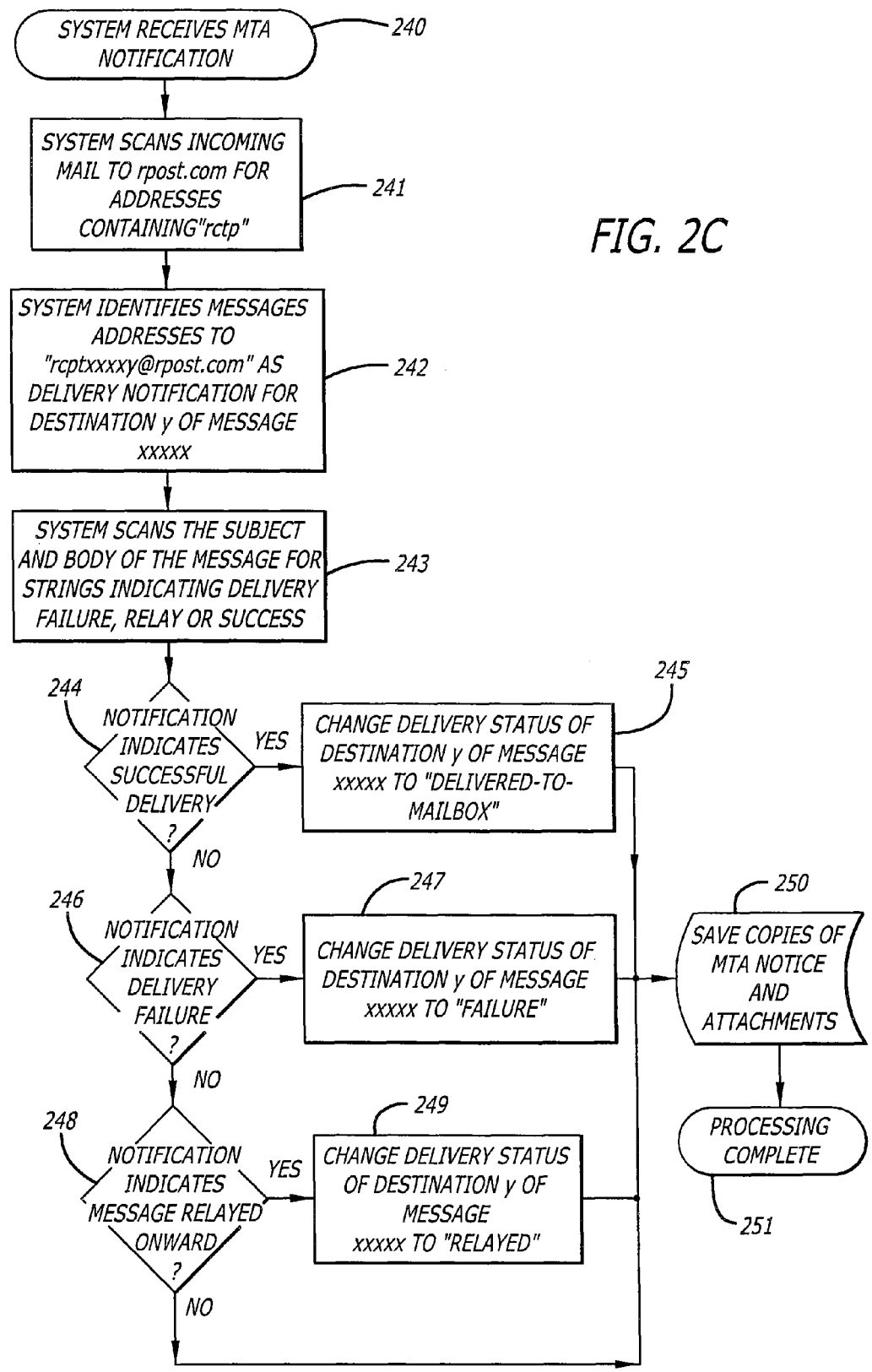

Having transmitted a message to its destination(s), the system must perform several functions in order to gather information about the message's disposition. FIG. 2C illustrates the process by which the system processes MTA Notifications returned by recipient MTAs.

Because of the format used in the headers of sent messages illustrated in FIG. 2B step 221, MTA message notifications will be delivered to a fictional local address at the server. The system will be able to detect these notifications by a string (e.g. "rcpt" embedded in their addresses (241). By parsing the address, as illustrated in 242, the system can determine which message to which destination prompted the received notification.

In step 243, the system scans the subject line and the body of received MTAs for phrases that indicate whether the MTA is reporting a successful delivery, a failed delivery, or that the message has been relayed to another server.

In the event that the process at step 243 reveals that the notification is reporting a successful delivery, the system will, as illustrated in step 245, change the Delivery Status of the relevant destination of the relevant message to "DELIVERED-TO-MAILBOX".

If the system determines that the MTA notice is reporting a delivery failure, the system will (247) change the Delivery Status of the relevant destination of the relevant message to "FAILURE".

In the event that the system determines that the MTA notification indicates that the message was relayed to another server, the system will, as illustrated in step 249, change the Delivery Status of the relevant destination of the relevant message to "RELAYED"'.

Having processed the MTA Notification, the system will save this message and all of its attachments in such manner that they may be later recalled and used in construction of a receipt for this destination (250).

Figure 2D:
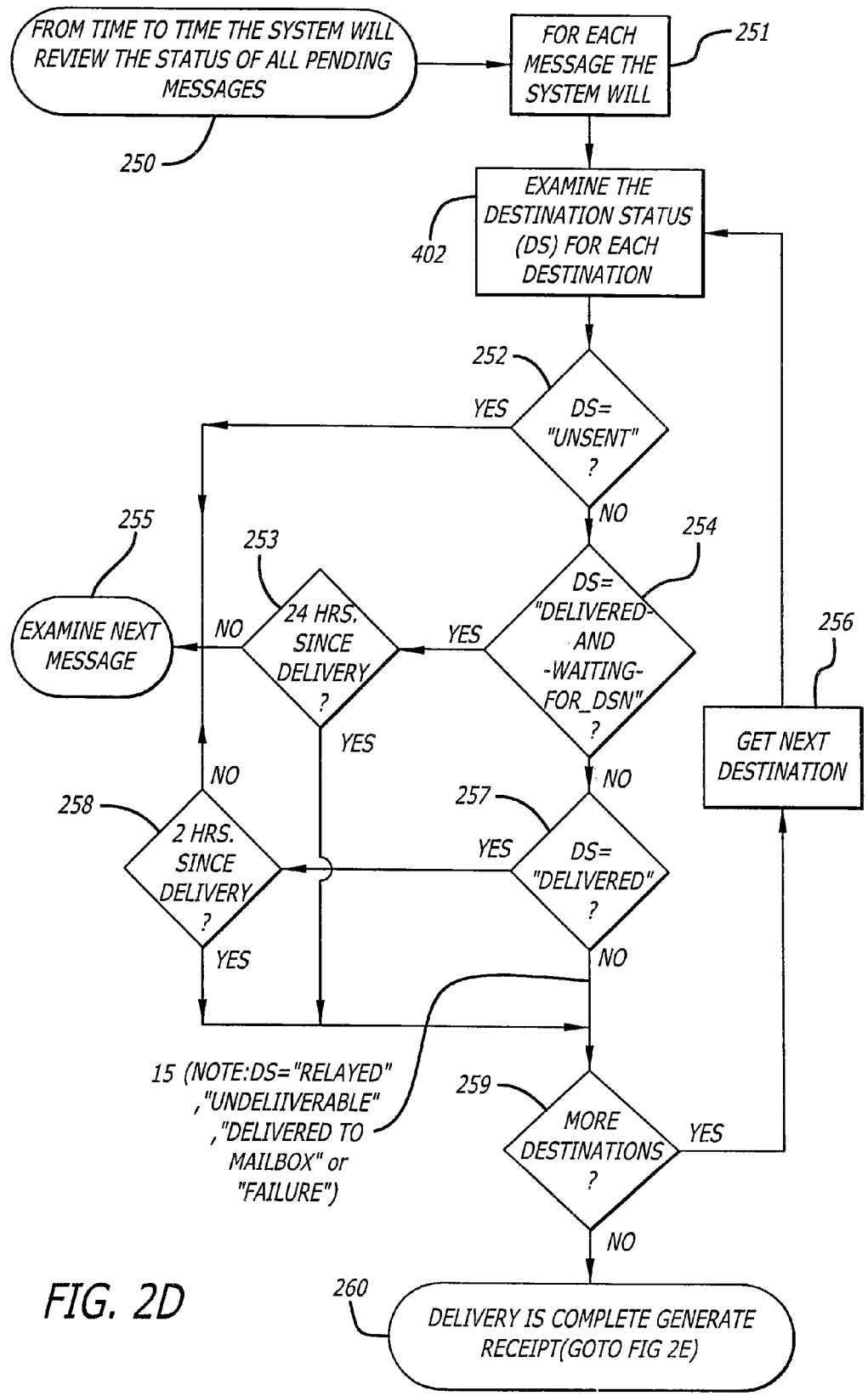

From time to time, as illustrated in FIG. 2D, the system will examine the status of each message to determine if the system has recovered all of the MTA notifications it is likely to receive for each destination of message and may hence proceed to construct a receipt for the message.

The system will examine the Delivery Status of each destination of the message.

If any destination has the Delivery Status "UNSENT", then the processing of the message is not complete. (252).

If the Delivery Status of a destination is "DELIVERED-AND-WAITING-FOR DSN", then the system will not regard the processing for this destination as complete unless, as is illustrated in step 254, the time since delivery of the message has exceeded the system's waiting period (e.g. 24 hrs.).

If the Delivery Status of a destination is "DELIVERED", (257) then the system will regard the processing of this destination as complete provided (258) that a period of time has elapsed which the operators of the system treat as sufficient to have received notice of delivery failure from the destination's MTA. (e.g. 2 hours).

Any other destination Delivery Status (e.g. "FAILED'", "UNDELIVERABLE", "DELIVERED TO MAILBOX") is treated as having completed processing.

If processing of any of a message's destinations is not complete the system takes no action but moves to consider other messages in the system (step 255).

However; as illustrated in step 259, if processing of every destination of the message is complete, the system will generate a Delivery Receipt for the message.

As illustrated by way of example in FIG. 2E, the receipt may include:

An identifier for administrative purposes as in block 271. This identifier may be or may include reference to the sender's ID and/or the value of the Internet Message-ID of the sender's message as received by the system.

As in block 272, the quoted body of the original message 12 together with the e-mail addresses of its intended recipients may also be included.

As in block 273, a table for each recipient listing may include:
  the time at which the recipient's MTA received the message and/or the time at which the system received DSN from the recipient's MTA;
  the Delivery Status report of the message for that destination, i.e., "Delivered to Mail Server", "Delivered to Mail Box", "Relayed", "Delivery Failure", "Undeliverable";

As in block 274, a list of the original attachments of the e-mail together with their separate hash values or message digests.

As in block 275, transcripts or abstractions of the transcripts of all of the SMTP dialogs involved in the delivery of the message to each destination.

As in block 276, quotations from the bodies and the attachments of all received DSNs including whatever details of delivery or disposition of the message that they might reveal.

As in block 277, the system may attach to the receipt copies of all of the attachments of the original message, and, as in block 278, the system may additionally attach files returned to the system as attachments to DSNs.

In step 279, having generated the text of the receipt so far, the system then generates a first hash for the e-mail message and a second hash(es) for any attachments to the body of the receipt and calculates a digital signature for each of the hash (es) using an encryption key known only to the operators of the system. Encryption can employ, for example, the Data Encryption Standard described in Federal Information Processing Standard Publication 4-2 (FIPS PUB 46-2), the Data Encryption Standard, National Institute of Standards and Technology, which is hereby incorporated by reference. Alternatively, other known or new methods of encrypting the hash value may be used.

In step 280, the encrypted hash is then appended to the end of the message as the "document digital signature".

In step 281, the receipt 20, now being complete, may be sent by e-mail to the sender with the advice that it be kept for the sender's records.

In step 282, the system may now delete all copies of the original message, attachments, and DSNs. Alternatively, rather than sending the receipt to the sender, the system may store the receipt, or both the sender and system can store the receipt.

Because MUA notifications are returned only at the option of the recipient and only when the recipient takes some action with respect to the received message, embodiments of the system may choose to treat these return messages differently than MTA notifications.

Figure 2F:
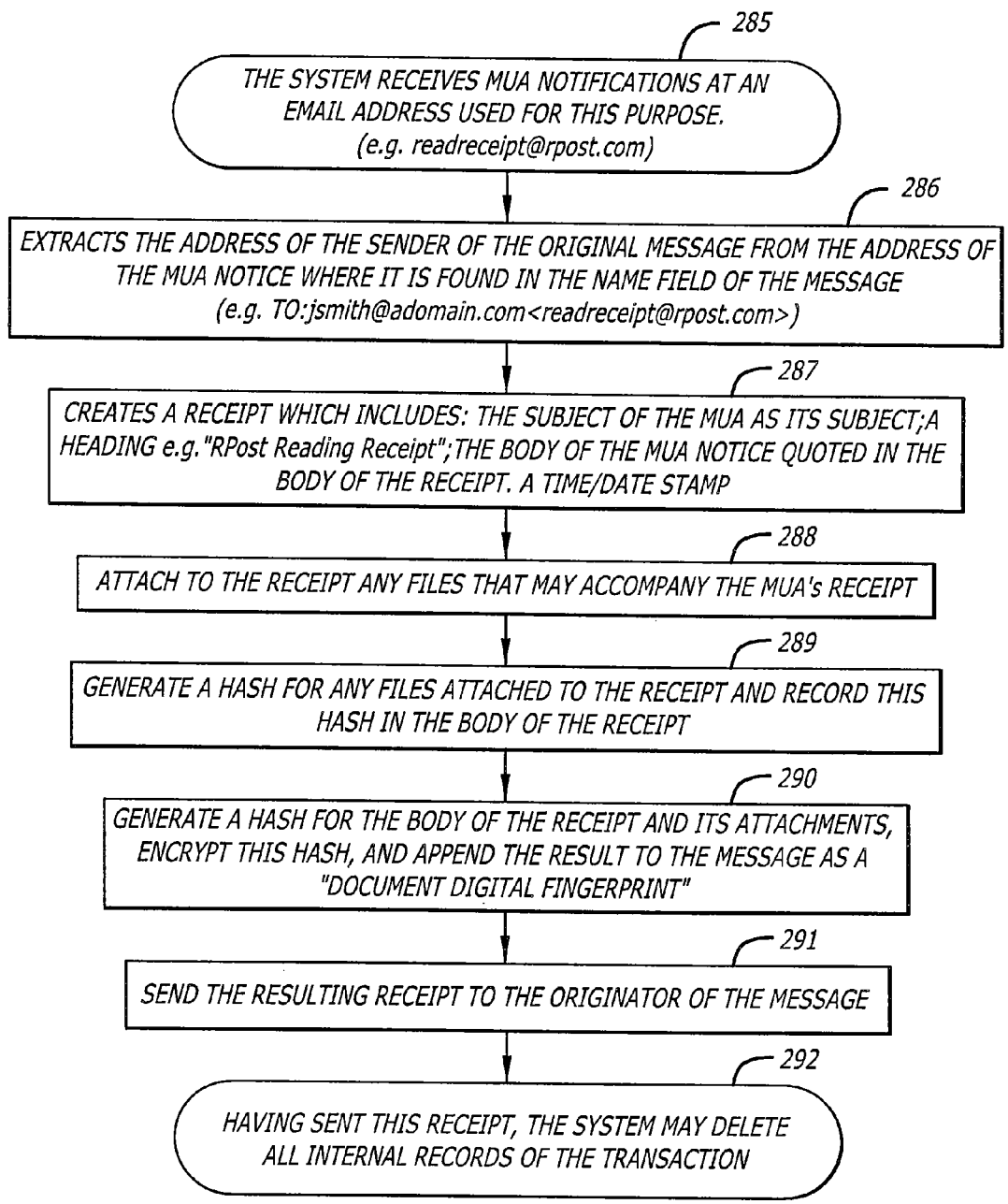

FIG. 2F illustrates how these MUA notifications may be treated by the system. MUA notifications are solicited by the system by including various headers in outgoing messages in the manner of FIG. 2A, step 211. These headers direct compliant MUAs to send notifications to a system address (e.g. readreceipt@RPost.com") set aside for this purpose. The headers also use, in the "name" field of this return address, the e-mail address of the original sender of the message. Accordingly, in step 286, when MUA notifications are returned to readreceipta, RPost.com the system can, by examining the address of the notification, determine the address to which a reading notification should be sent.

Upon the arrival of a read receipt from a destination's MUA, the system, in step 287, generates a reading receipt that contains the subject of the received MUA notification as its subject and incorporates, in its message body, the body of the received MUA Notification.

In step 288, the system attaches to the receipt any files that may accompany the MUA's receipt (typically these may include details of delivery or disposition and identifying references to the original e-mail.)

In step 289, the system generates a hash for any files attached to the receipt and records this hash in the body of the receipt.

In step 290, the system generates a hash for the body of the receipt and its attachments, encrypts this hash, and appends the result to the message as a "document digital signature".

In step 291, the system sends the resulting receipt to the sender of the message. In step 292, having sent this receipt, the system may delete all internal records of the transaction.

III. RPost as Secondary Mail Server Embodiment

Figure 3:
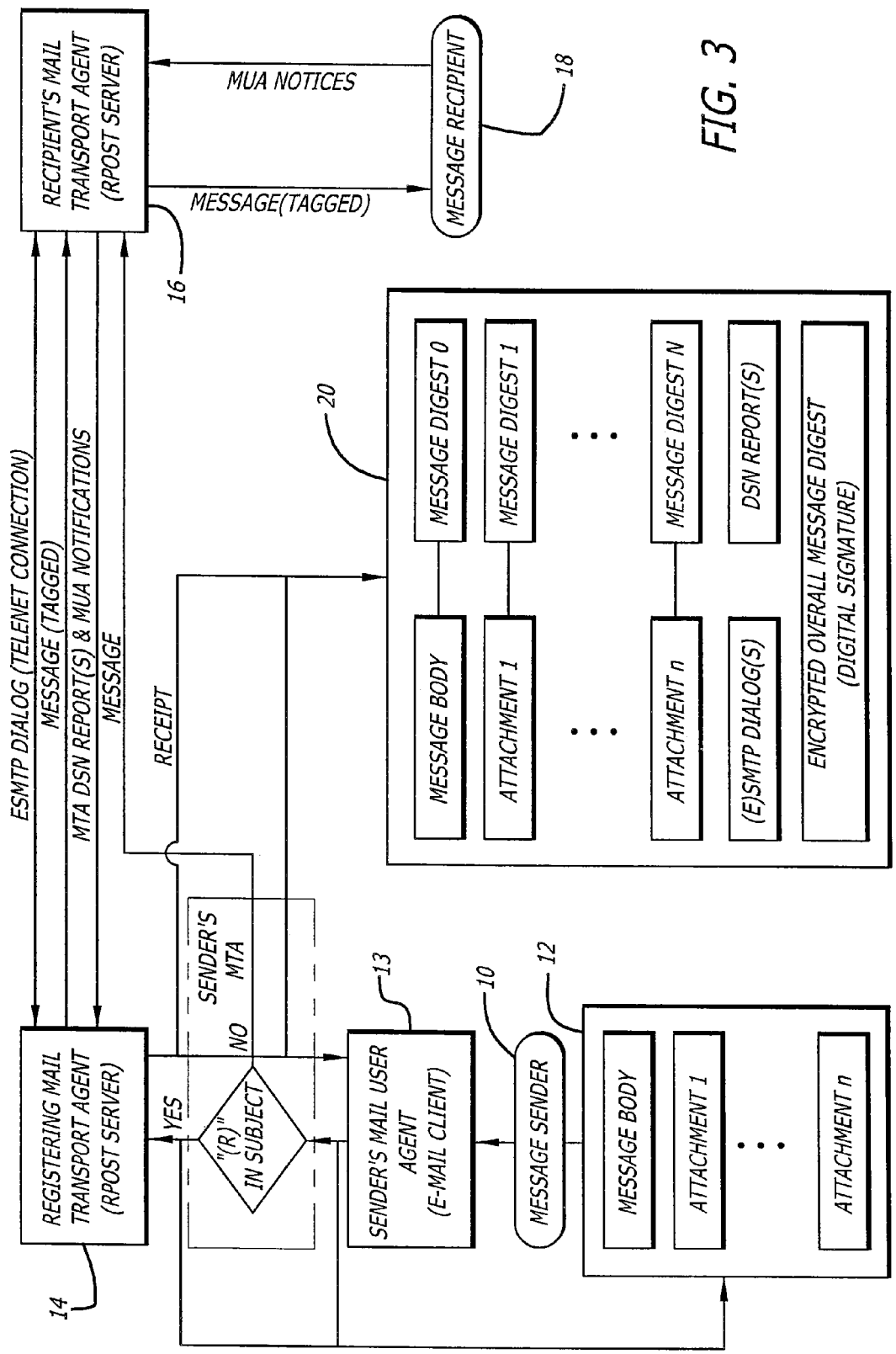
FIG. 3 is a system diagram of a second embodiment of the present invention, in which senders may direct a Mail Transport Agent to transmit selected messages through a separate registering MTA.

FIG. 3. is a system diagram of a second embodiment of the present invention wherein the RPost server does not serve as the user's primary MTA but rather works in collaboration with another MTA. In this embodiment, the sender may elect to register a particular outgoing message by including some form of flag in an outgoing message, message subject, or message addresses. For example, if and only if a sender includes the symbol "(R)" in the subject of the message the sender's MTA will direct the message to be transmitted through the RPost server to generate a receipt.

In this embodiment the operators of RPost receive revenues from the operator of the sender's MTA per message and/or per kilobyte transmitted.

IV. CC to RPost Embodiment

Figure 4:
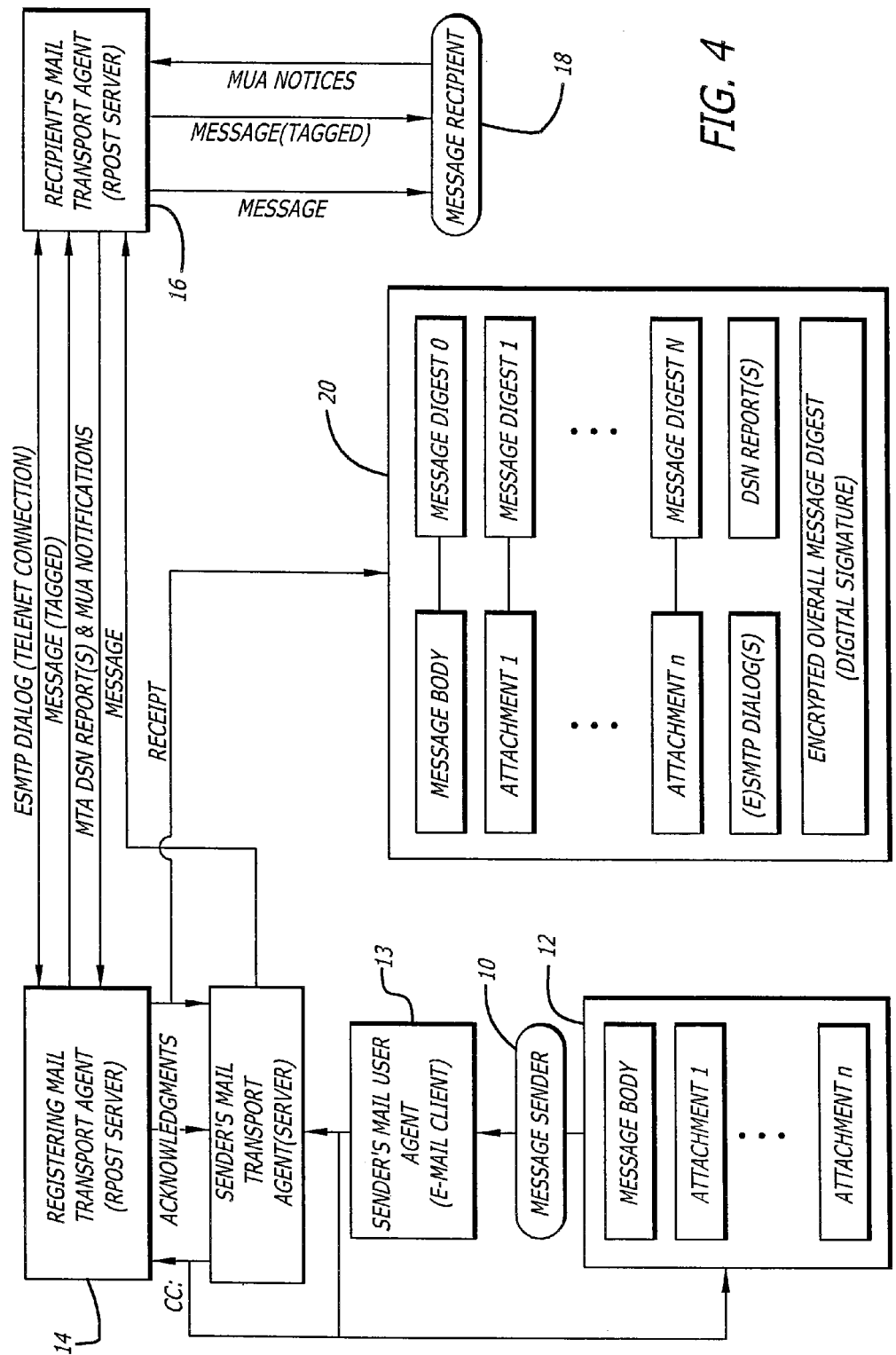
FIG. 4 is a system diagram of a third embodiment of the present invention, in which carbon copies (cc's) of outgoing messages are sent to a special server to be registered.

FIG. 4 is a system diagram of a third embodiment in which a carbon copy ("cc") is sent to the RPost server. In this embodiment, the user or message sender 10 can use a standard MUA and standard MTA without modification. Message sender 10 composes the e-mail having a message body and any number of attachments, and addresses it to message recipient 18, along with any carbon copies (cc's) and blind carbon copies (bcc's) as desired. Additionally, message sender 10 addresses a cc to RPost. RPost server 14 tags the message as before, and sends the tagged message including attachments to the recipient's MTA 16 and any designated cc's. On receipt of such a copy RPost Server 14 may send an e-mail acknowledging receipt of the copy.

Recipient 18 and other destinations of the message will now receive two versions of the same message: a first version of the message received directly from sender 10, and a second and tagged version which was forwarded from RPost. Once RPost receives confirmation from recipient MTA 16 that the tagged version of the message was successfully received by recipient MTA 16, RPost server 14 composes message receipt 20 as before and sends the receipt to sender 10 for his records.

Revenue can be generated by establishing accounts for message originating domains or individual message senders, and charging the users' accounts per message, per kilobyte, per month, or a combination of these. Revenue can also be generated for the placement of advertisements on receipts and from authentication and verification services as previously described.

V. Website Embodiment

Figure 5:
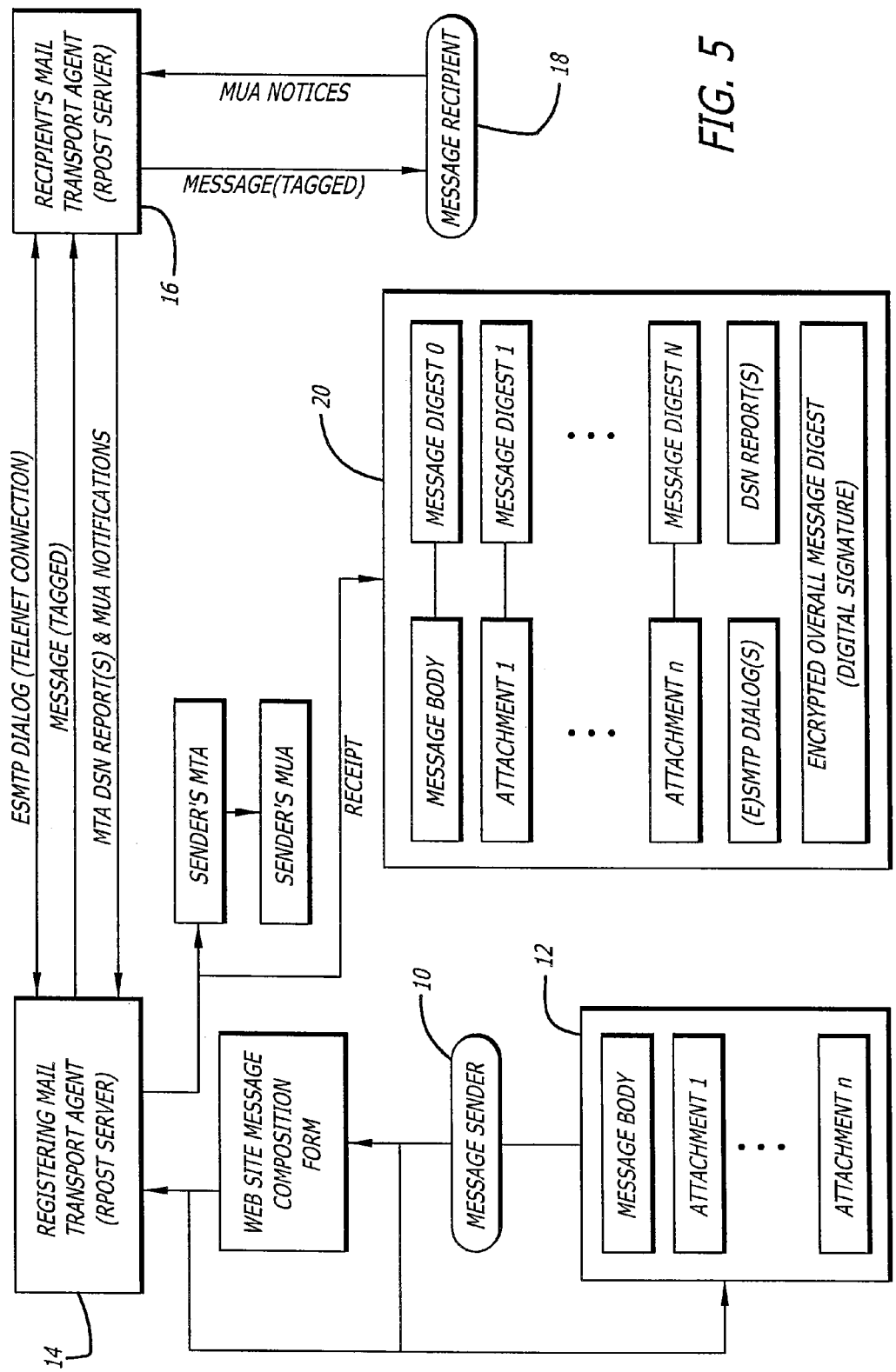
FIG. 5 is a system diagram of a fourth embodiment of the present invention, in which users compose outgoing messages to be registered at a designated website.

FIG. 5 is a system diagram of a fourth embodiment. In this embodiment, RPost server 14 is associated with a website at which a user composes messages. Message sender 10 visits the RPost Website and composes his message at the website by entering the desired "to", "cc", "bcc", "Subject", and message text information. Attachments can be added by using features available on standard browsers and web servers. In this embodiment, the sender must additionally provide an address to which the registration receipt may be sent. RPost server 14 sends the receipt to sender 10 through sender's MTA.

Revenue can be generated by establishing accounts for message originating domains or individual message senders, and charging the users' accounts per message, per kilobyte, per month, or a combination of these. Revenue can also be generated for the placement of advertisements on receipts and from authentication and verification services as previously described.

VI. Web Based MUA Embodiment

Figure 6:
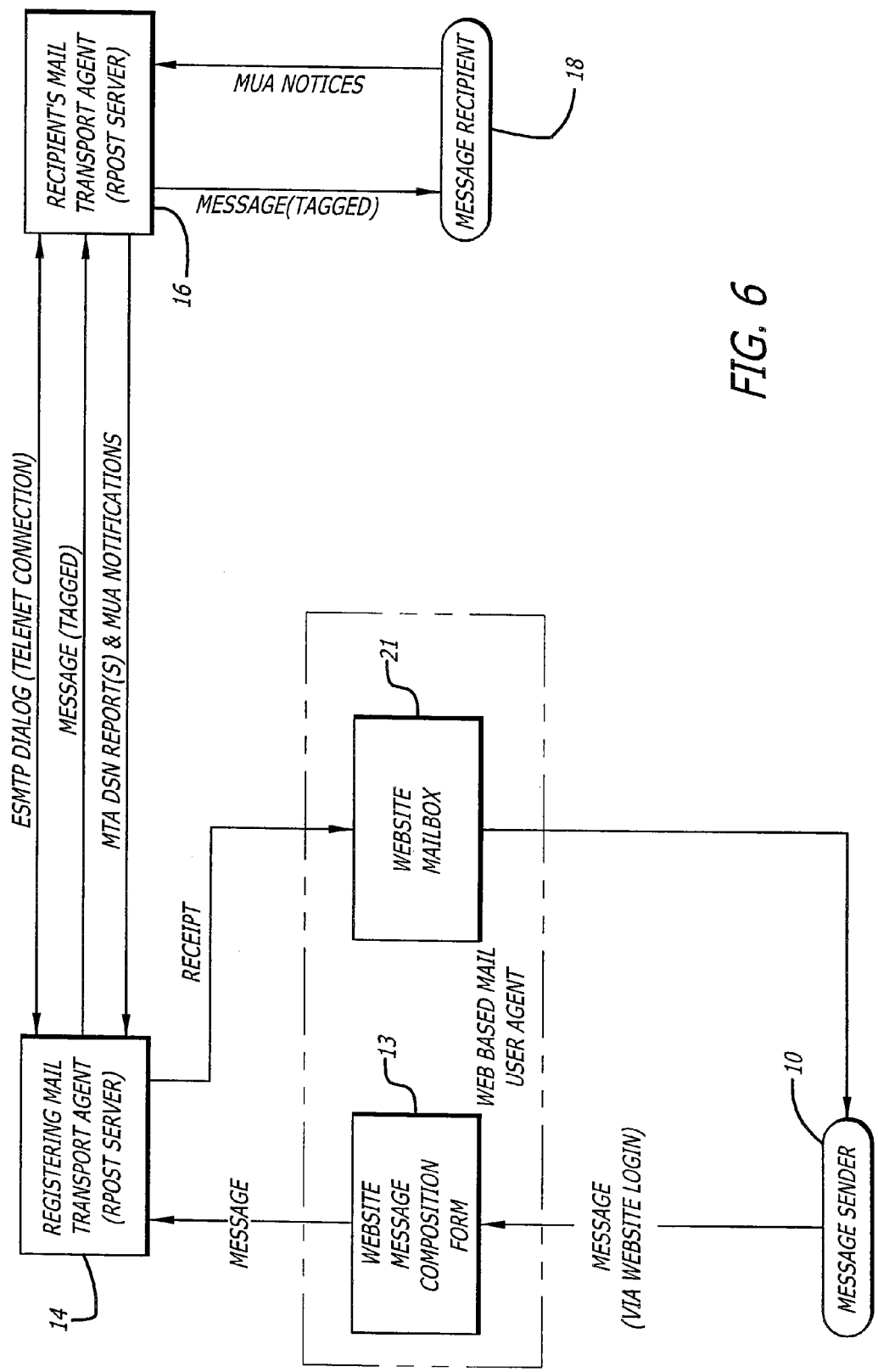
FIG. 6 is a system diagram of a fifth embodiment of the present invention in which users may send registered e-mails and store receipts from within a Web Based Mail User Agent (MUA).

FIG. 6 is a system diagram of a fifth embodiment. In this embodiment, the RPost server 14 is associated with a web based Mail User Agent. In addition to allowing users to compose mail through a web browser, such an MUA provides subscribers with browser viewable mailboxes that display messages stored on the Web server site. Subscribers to such a service gain access to mail accounts with usernames and passwords. In this embodiment, message sender 10 visits the RPost Website, accesses a Web Based e-mail account by entering a username and password, and composes his message which is transported for delivery to RPost Server 14. Receipts generated by the RPost server are returned to a web based mailbox associated with the subscriber's account.

In addition to the revenue sources available in other embodiments, in this embodiment the operators can charge storage fees for receipts held in the web based mailbox.

In all of these embodiments, the receipt may serve as evidence that:
(1) the originator sent an e-mail message;
(2) the message was sent at a certain time;
(3) the e-mail was addressed to certain recipient(s); 37
(4) the e-mail was delivered to the e-mail mailbox of each of its intended recipient's);
(5) the e-mail was delivered at a certain time;
(6) the e-mail was delivered by a certain network route; and
(7) the e-mail message and its attachments had the specific content recorded in the receipt.

Furthermore, the system under certain circumstances generates a separate receipt, which may be used as evidence that:
(1) the e-mail was inspected through the recipient's Mail User Agent (MUA); and
(2) the recipient took certain actions in response to the message, e.g., read or deleted the e-mail, at a particular time.

As with the other embodiments, this embodiment produces documented evidence which may be attested to and verified by the disinterested third party operators of the system of the delivery and integrity of an electronic message. In other words, the system can be thought of as transforming the e-mail to a registered e-mail that can later be used to prove that a particular e-mail message was sent, that it was successfully delivered, and when and how.

Should a dispute ever arise, the dispute can be resolved through the receipt generated by the system because the receipt is so encoded that the operators of the system can determine the authenticity of the receipt as the product of the system. Thereafter, operators of the system can attest to the accuracy of the information contained in an authentic receipt, relying only on information contained in the receipt itself and without the need for the operators to preserve any record or copy of the information contained in the receipt.

In addition to these benefits, the receipts generated by the system may also be useful as evidence of the existence and authorship of such materials as might be transmitted through the system. Moreover, the system is easy to use, as the system can be used from any Internet e-mail client program/MUA, so that there is no additional software required.

Flow Diagram for Validating a Receipt

Figure 7A:
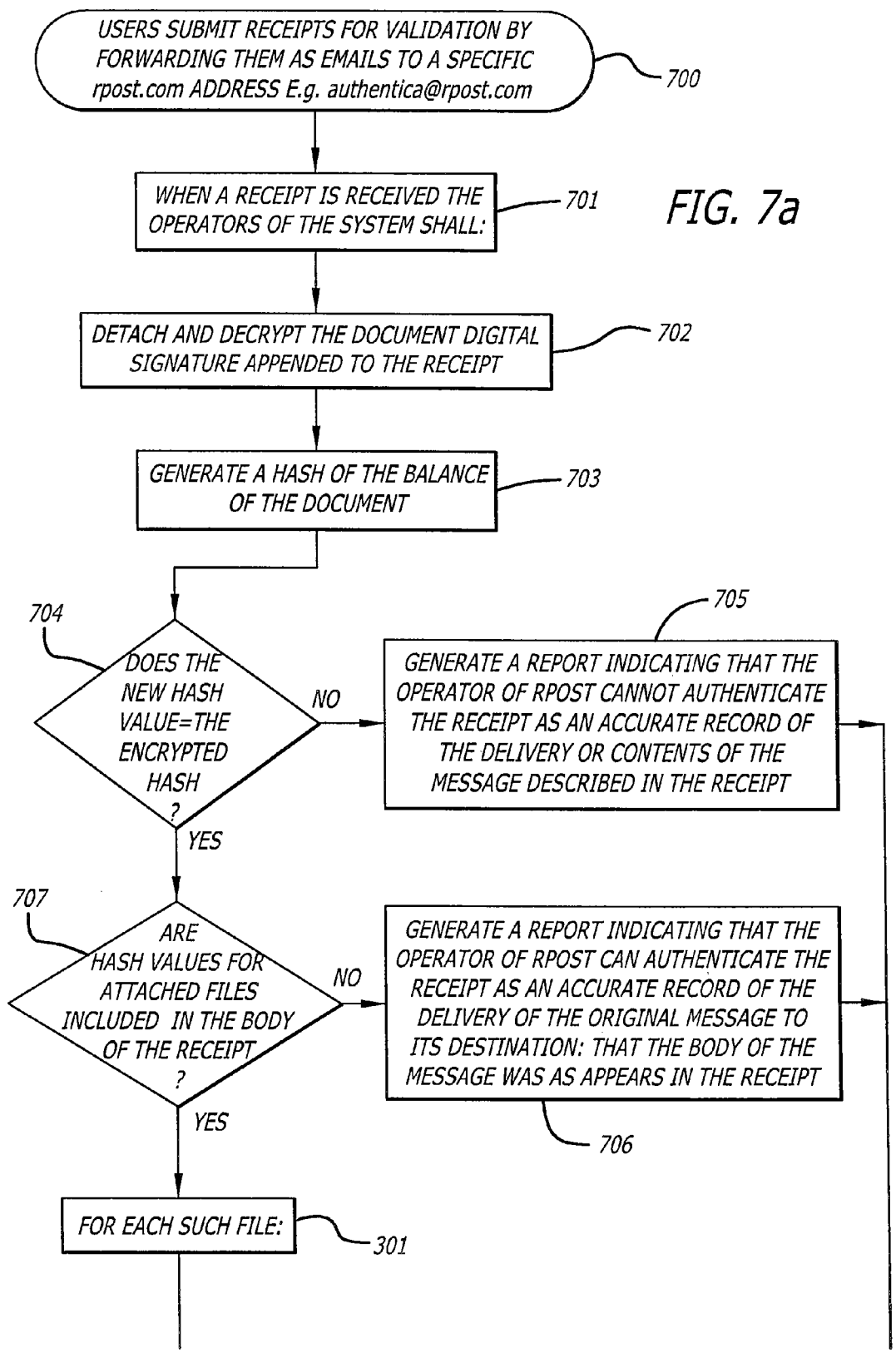
FIG. 7 is a flow diagram for validating a registered e-mail receipt.
Figure 7B:
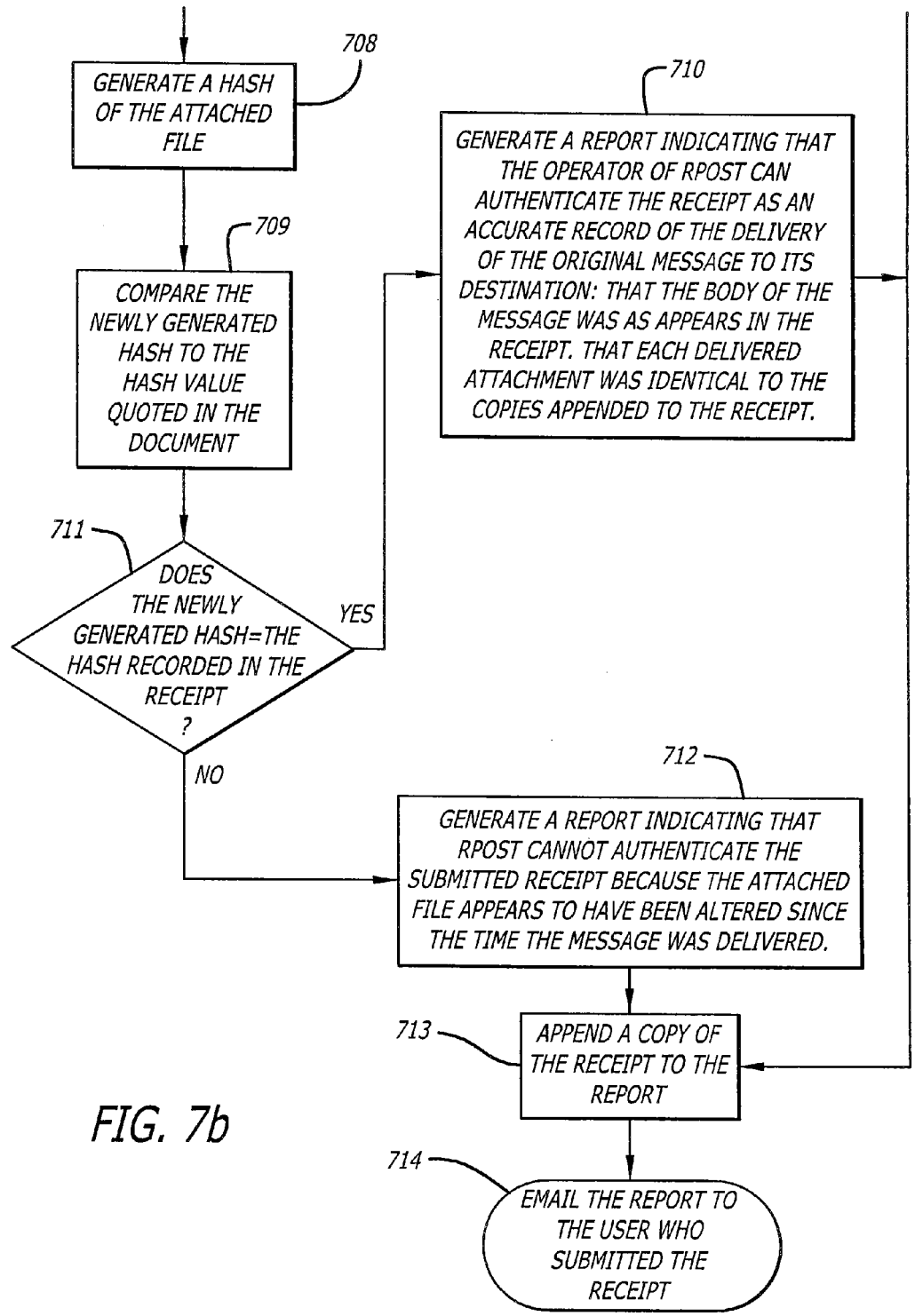

FIG. 7 is a flow diagram illustrating an exemplary method for validating a receipt. In the event that the sender of a message should require evidence that an e-mail was sent and delivered (and/or read) the sender presents the receipt(s) corresponding to the message to the operators of the system in step 700. The operators of the system then, in step 702, detach and decrypt the document digital signature appended to the receipt. In step 703, the operators generate a hash of the balance of the document, including attachments.

In step 704, if the current hash value does not match the decrypted hash value, then the system generates a report stating that RPost cannot authenticate the receipt as an accurate record of the delivery or the contents of the message described in the receipt.

If the decrypted hash is equivalent to the current hash of the message, the system can, as in step 706, warrant that the information contained in the body of the message is unchanged since the receipt passed through the system. If the original message contained no attachments, the system may now generate a report that warrants that the receipt is an accurate record of the message's contents and its delivery by the RPost Server.

If the receipt reports that the original message contained attachments; then the receipt will also record the name and hash value of each attachment. In generating the receipt all attachments of the original message are attached unchanged to the receipt. Accordingly, the system will, for each such attached file, generate a hash of the attached file (708) and compare it to the hash value recorded in the body of the receipt (709).

If the calculated hash value of a file matches the value included in the receipt, the system can warrant that the file attached to the receipt is identical to that attached to the message as originally delivered. If the hashes do not match, then the system will report that it cannot warrant that the file attached to the receipt is identical to the file attached to the original message.

Having performed this calculation for each file attached to the original message, the system prepares a report which reports on the authenticity of the receipt and each of its attached files (710) or which reports the failure of validation (712).

Having completed its evaluation, the system will then append a copy of the receipt and all of its attachments to the report it has generated and send it via e-mail to the return address of the user who submitted the report for validation.

VII. Registering Inbound E-mails

Figure 8:
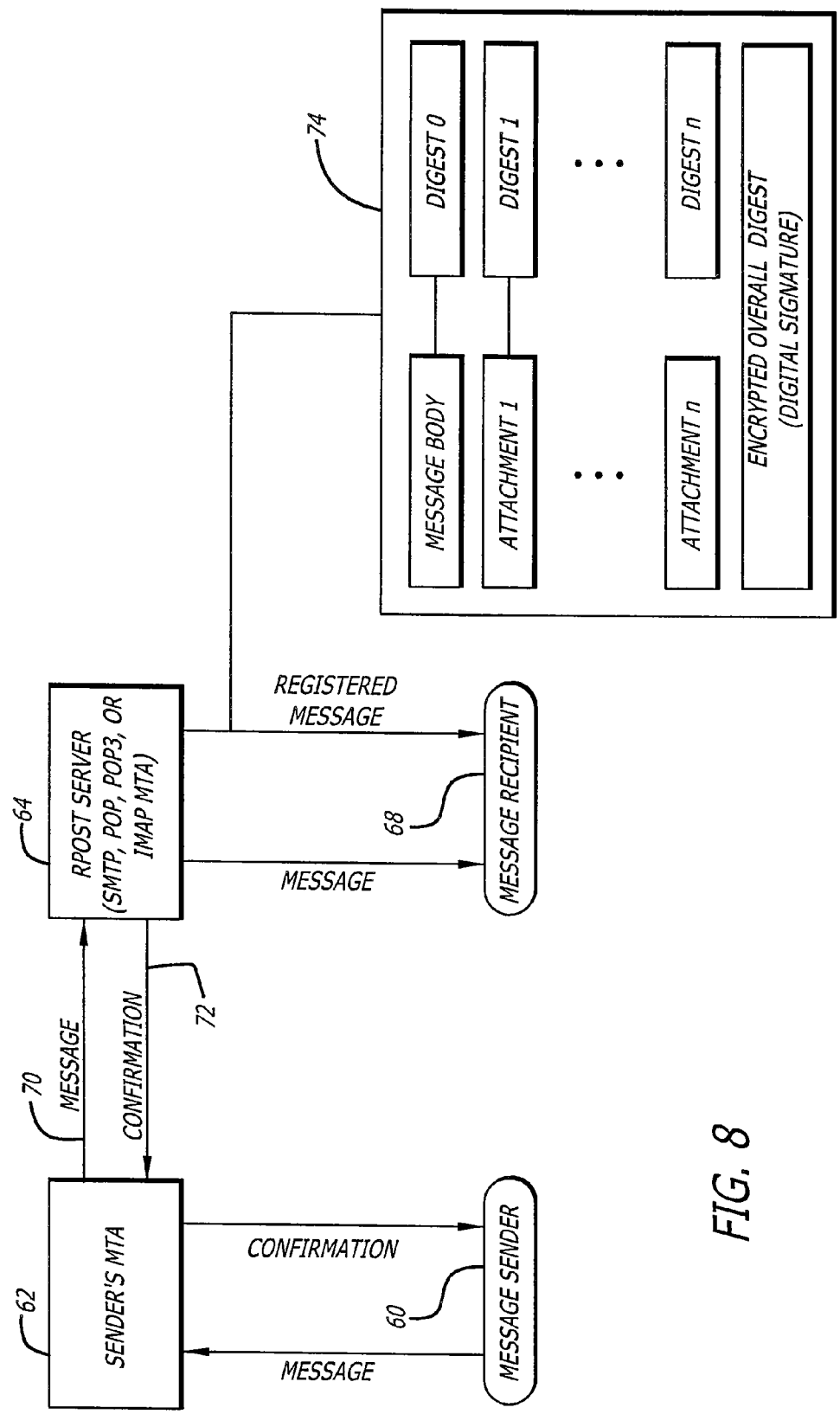
FIG. 8 is a system diagram of an embodiment of the present invention for registering incoming messages.

FIG. 8 is a system diagram illustrating another embodiment of the invention in which incoming e-mails are registered. In this embodiment, a message sender 60 sends an e-mail message 70. Sender's MTA 62 sends message 70 onto the Internet as usual. However, in this embodiment RPost contracts with service subscriber/recipient 68 to register incoming e-mails. According to the agreement, RPost is designated with Network Solutions, Inc. (NSI) or other domain name authority as the mail recipient (MX server) for recipient 68. This causes the Domain Name Service (DNS) request performed by the sender's MTA 62 to return the IP address of RPost as the IP address for the recipient, which in turn causes sender's MTA 62 to send the e-mail message to RPost server 64. RPost server 64 acts as an SMTP, POP, POP3 or IMAP MTA (collectively, "POP mail server") for recipient 68. SMTP, POP and IMAP MTAs are governed by RFC 821, the SMTP protocol, RFC 1939 Post Office Protocol—Version 3 (which obsoleted RFC 1725), and RFC 2060 IMAP (Internet Message Access Protocol) Version 4 rev 1 (which obsoleted RFC1730), which are hereby incorporated by reference.

RPost Server 64 prepares a registered version 74 of the original message 70, and places this registered version 74 into recipient 68's in-box instead of, or in addition to, the original message 70. The registered version may have all of the verification and informational features and options discussed earlier in connection with e-mails receipts. This information can include, but is not limited to: individual message digests for each of the message body and text, the to/from information, other header information, each attachment, an overall message digest and digital signature and message routing information and tags. Registered version 74 of message 70 as shown in FIG. 6 includes the message body including the header information, an attachment, separate message digests for each, and a digital signature or encrypted message digest. The hash functions and encryption are performed using private phrases or private keys known only to the operators of the system. The registered version 74 is made available to recipient 68 for inspection or downloading through the recipient's MUA.

RPost server can optionally send a confirming e-mail 72 to message sender 60. Confirmation message 72 can be a simple text message indicating that a message was received and registered. Confirmation message 72 could also include a message such as: "Your e-mail message was received on Mar. 24, 2000 at 2:05 p.m. The digital signature of the message was [128-bit digital signature]. For more information, visit our website at www.RPost.com." Alternatively, or additionally, confirmation message 72 could include all of the information contained in the registered version 74.

Thus, the system may provide to message recipient 68 a receipt 74 or other verifiable confirmation that:
(1) the recipient received an e-mail message;
(2) the message was received at a certain time;
(3) the e-mail was addressed from a certain sender;
(4) the message purports to be delivered via a certain network route; and
(5) the e-mail message and its attachments had a specific content.

Accordingly, the system provides evidence, which may be attested to by the operators of the system, that particular electronic messages and documents were delivered to recipients having certain content and representing themselves as having come from certain senders.

Figure 9:
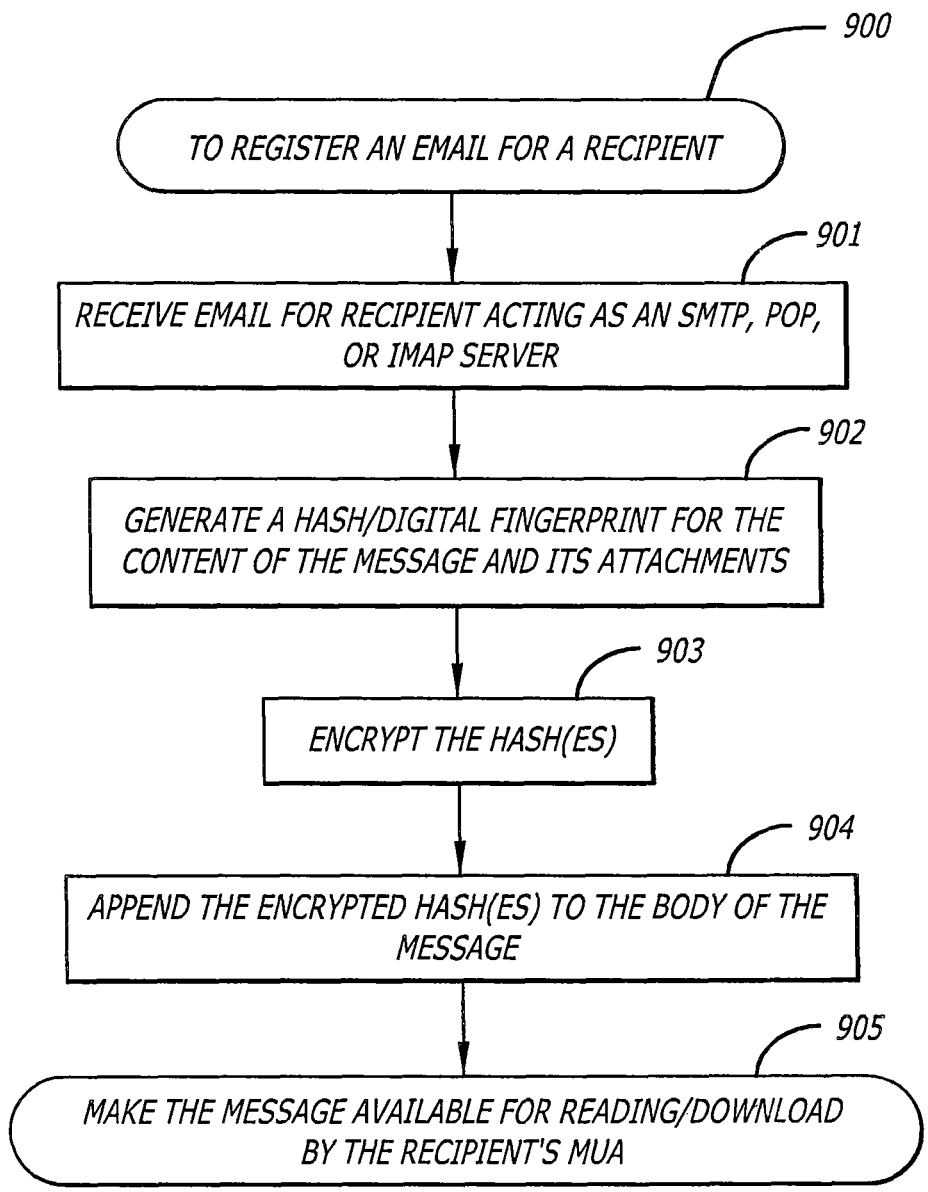
FIG. 9 is a flow diagram for registering incoming messages.

FIG. 9 is a flow chart illustrating one example of registering in-bound mail. In step 901, RPost server 64 receives a new e-mail message. In step 902, the system generates a hash/digital signature of the message's contents including the message's headers and attachments. Additionally, the system may generate a separate hash for each message attachment. In step 903, the system encrypts the hash(es) using an encryption key known only to the operators of the system. In step 904, the resulting encrypted hash(es) is then appended to the body of the message. Then, in step 905, the modified message may be made available for inspection or download through the recipient's MUA.

Figure 10:
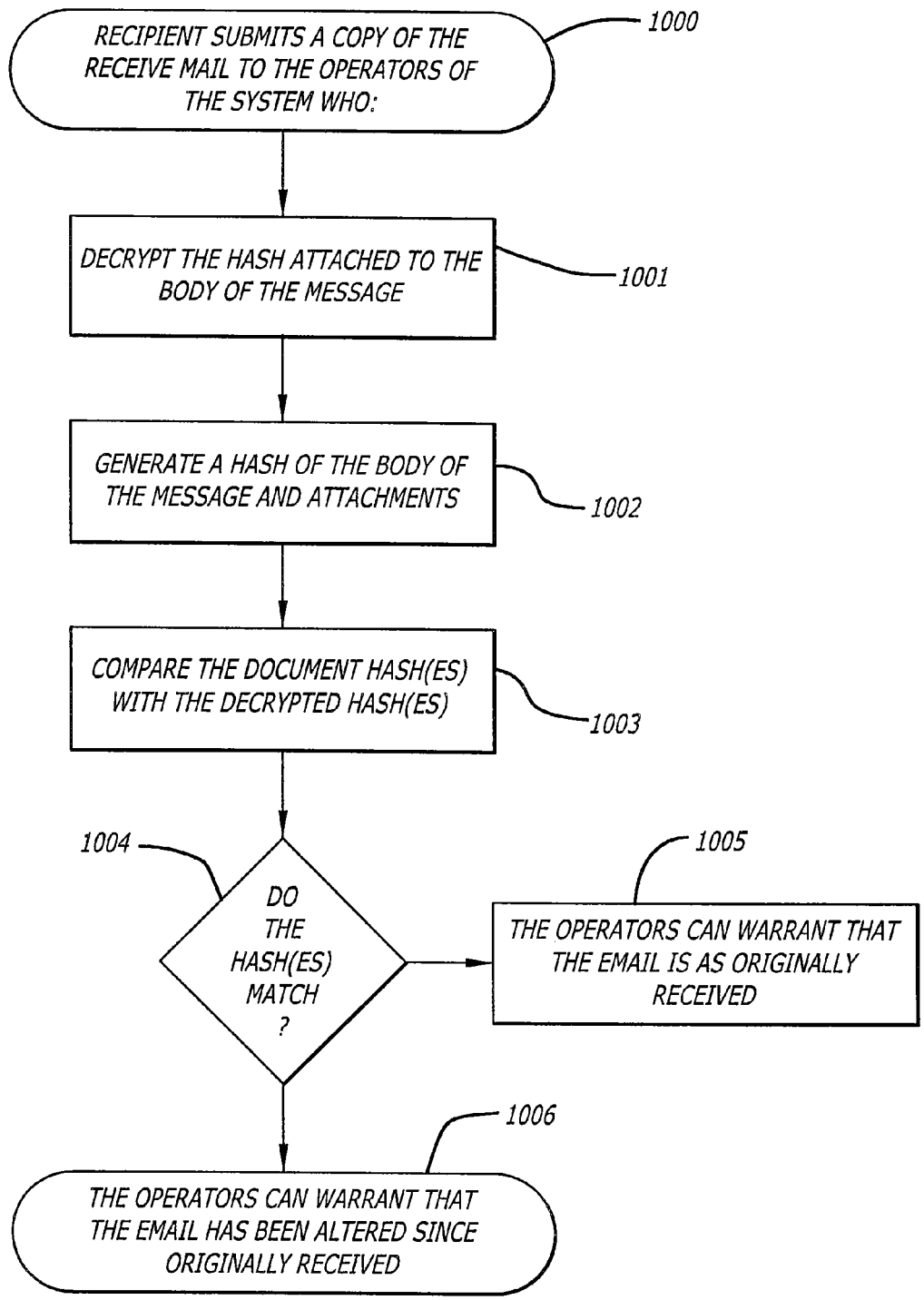
FIG. 10 is a flow diagram for validating received registered messages.
Figure 11:
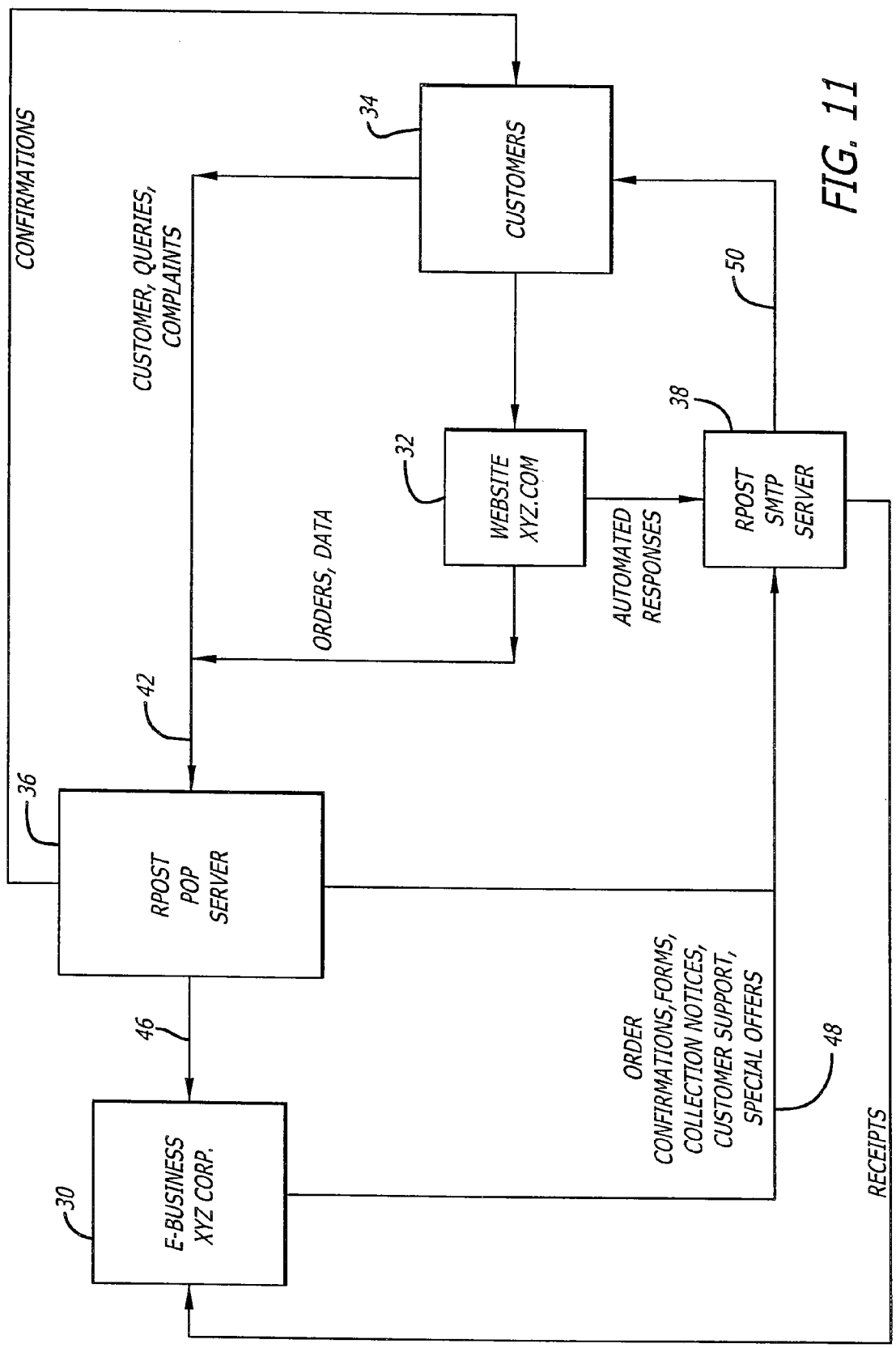
FIG. 11 is a system diagram showing an exemplary use of the present invention by an e-business to register and acknowledge incoming and outgoing communications.

FIG. 10 is a flow chart of one example of validating a received registered e-mail message. In step 1000, in the event that the recipient of a message should require evidence that an e-mail with a specific content was received at a particular time, the recipient can present a copy of the registered version 74 (FIG. 8) of e-mail message 70 to the operators of the system for verification. To verify the message, in step 1001 the system detaches and decrypts the document digital signature appended to the message. In step 1002, the system generates a hash of the balance of the document, and one for each file attached to the message. In steps 1003 and 1004, the hashes are compared. If the document hash(es) matches the decrypted hash(es), then the message and its attachments must have passed through the system and have not been altered since their delivery to the 5 recipient.

Having determined that the e-mail is unaltered, the operators of the system can warrant that:
(1) the e-mail was received by the system at a certain time;
(2) the e-mail purported to arrive at the system via a certain Internet route;
(3) the e-mail purported to be from a certain sender; and
(4) the e-mail and its attachments were delivered with. the specific content they currently contain.

On the other hand, in step 1006, if the hash values do not match, then the operator cannot warrant that the e-mail is authentic, i.e., that the e-mail is an accurate version of an e mail that was received by the system.

FIG. I1 illustrates how the invention may be used by a business which utilizes electronic tools (an "e-business"). E-business 30 can utilize the system to register all incoming and outgoing e-mail messages from its customers 34. In this case, the system includes Post Office Protocol (POP) server 36 and Simple Mail Transfer Protocol (SMTP) server 38. For example, the e-business 30 can set up its website to e-mail forms to customers, and to forward queries and complaints 40 from customers 34. The registered queries, complaints, orders; offers to purchase, and other information 46 are sent to the e-business 30 by the system. Receipts are then provided to the customers 34 via SMPT server 38. This way there is no question regarding whether or not the customer sent the communication and what it contained. Moreover, the e-business can set up a web site 32 through the RPost server so that every communication with the customers can be registered. In other words, through the web site form data orders 42 and automated responses 44 can be registered through the system server; furthermore, any confirmation, collections notices, customer support, and special offers 48 sent by the e-business to customers 34 can be registered and the confirmation sent to the customer to eliminate arguments about what was ordered, when, or by whom. If desired, identical receipts can be provided to both the customers 34 and to e-business 30. Alternatively, the functions of POP server 36 and SMTP server 38 may be combined in a single system server.

POP is a protocol used to retrieve e-mail from an e-mail server. Many e-mail applications (sometimes called e-mail clients) use the POP protocol, although some can use the newer Internet Message Access Protocol (IMAP). One version of POP, called POP2, requires SMTP to send messages. A newer version, POP3, can be used with or without SMTP. SMTP is a protocol for sending e-mail messages between servers. Many e-mail systems that send e-mail over the Internet use SMTP to send messages from one server to another; the messages can then be retrieved with an e-mail client using either POP or IMAP. In addition, SMTP is generally used to send messages from a mail client to a mail server. E-mail servers may use a variety of protocols to communicate with the Internet. Commonly used protocols include SMTP, POP3 and IMAP4. Mail readers are at the opposite end of the server. Since mail servers receive messages via SMTP, e-mail readers send e-mail to a mail server using SMPT. Likewise, since mail servers send messages using POP3 and optionally IMAP4, mail readers receive messages from mail servers by using the POP3 or IMAP4 protocol.

Although the above generally describes a system and method of verifying that an e-mail was sent and/or received, the present invention may apply to any electronic message that can be transmitted through a electronic message network or through any electronic gate. Electronic messages may include text, audio, video, graphics, data, and attachments of various file types. The methods and techniques taught herein can be programmed into servers and other computers, and computer programs implementing the invention can be written onto computer readable media including but not limited to CD ROMs, RAM, hard drives, and magnetic tape. E-mail registration services according to the present invention can be bundled with Internet service provider (ISP) services to provide a single provider ISP solution to corporate and other institutional clients. Implementing the above-described invention is within the skill of the ordinary practitioner of the software arts.

Although the present invention has thus been described in detail with regard to the preferred embodiments and drawings thereof, it should be apparent to those skilled in the art that various adaptations and modifications of the present invention may be accomplished without departing from the spirit and the scope of the invention. Accordingly, it is to be understood that the detailed description and the accompanying drawings as set forth hereinabove are not intended to limit the breadth of the present invention, which should be inferred only from the following claims and their appropriately construed legal equivalents. In the following claims, those claims which contain the words "means for" are intended to be interpreted in accordance with 35 U.S.C. §112, paragraph 6; those claims which do not include the words "means for" are intended to not be interpreted in accordance with 35 U.S.C. §112, paragraph 6.

What is claimed is:

1. A method of transmitting a message from a sender to a recipient and providing an indication that the message was opened by the recipient, comprising:
   receiving the message at a server from the sender, the server being displaced from the recipient,
   associating a link with the message by the server, the link configured to execute when the link is activated at the recipient to provide an indication that the message has been opened by a recipient,
   transmitting the message and the link from the server to the recipient,
   executing the link when the link is activated at the recipient to control the server to provide an indication that the message has been delivered to the recipient,
   providing an authenticatible information related to the message, including the indication of the delivery of the message at the recipient, at the server, and
   transmitting the indication of the delivery of the message at the recipient, and the authenticatible information from the server to the sender.

2. The method of claim 1, wherein the link is activated by a server at the recipient.

3. The method of claim 2, wherein the link is automatically activated by the server at the recipient upon the first interaction of the link with the server at the recipient.

4. The method of claim 2 wherein the link is activated by any servers encountered by the message as the message is relayed through a network when the message is transmitted from the server to the recipient.

5. The method of claim 4, where each activation of the link results in a record being made at the server of the activation of the link, and
   storing the record in a memory.

6. The method of claim 1, wherein the link is activated at the recipient to provide an indication that the message has been opened by the recipient.

7. The method of claim 6, wherein the indication of the opening of the message at the recipient, and the authenticatible information are stored in a memory.

8. The method of claim 7, wherein the memory is associated with the server.

9. The method of claim 7, wherein the memory is in communication with the server, but is not associated with the server.

10. The method of claim 1, wherein the indication of the delivery of the message, and the authenticatible information are stored in a memory.

11. The method of claim 10, wherein the memory is associated with the server.

12. The method of claim 10, wherein the memory is in communication with the server, but is not associated with the server.

13. The method of claim 1, wherein the link is transmitted to the recipient using a web-services protocol.

14. The method of claim 1, wherein associating the link with the message includes associating the link or a different link with an attachment to the message, the link configured to activate when the attachment is opened at the recipient to provide an indication that the attachment was opened at the recipient.

15. The method of claim 1, wherein the link is activated when the recipient clicks on the link.

16. The method of claim 15, wherein activating the link also causes information to be displayed to the recipient and to control the server to make a record of the information displayed.

17. The method of claim 15, wherein the information displayed contains a second link, the second link being activated when the recipient clicks on the second link, wherein activating the second link causes a second information to be displayed to the recipient and to control the server to make a record of the second information displayed.

18. A system transmitting a message from a sender to a recipient and providing an indication that the message was opened by the recipient, comprising:
- a server in electronic communication with the sender and the receiver, the server programmed to receive a message from the sender, to associate a link with the message, the link configured to execute when the link is activated at the recipient to provide an indication that the message has been opened by a recipient, to transmit the message and the link from the server to the recipient, wherein
- the link is executed when the link is activated at the recipient to control the server to provide an indication that the message has been opened at the recipient, and
- wherein the server is programmed to form an authenticatible information related to the message, and to transmit the indication of the opening of the message at the recipient and the authenticatible information from the server to the sender.

19. The system of claim 18, wherein the link is activated by a server at the recipient.

20. The system of claim 19, wherein the link is automatically activated by the server at the recipient upon the first interaction of the link with the server at the recipient.

21. The system of claim 19, wherein the link is activated by any servers encountered by the message as the message is relayed through a network when the message is transmitted from the server to the recipient.

22. The system of claim 21, where each activation of the link results in a record being made at the server of the activation of the link, and the server is programmed to store the record in a memory.

23. The system of claim 18, wherein the indication of the opening of the message at the recipient, and the authenticatible information are stored in a memory.

24. The system of claim 23, wherein the memory is associated with the server.

25. The system of claim 23, wherein the memory is in communication with the server, but is not associated with the server.

26. The system of claim 23, wherein the link is transmitted to the recipient using a web-services protocol.

27. The system of claim 23, wherein the server associates the link or a different link with an attachment to the message, the link configured to activate when the attachment is opened at the recipient to provide an indication that the message was delivered to the recipient.

28. The system of claim 18, wherein the server associates the link or a different link with an attachment to the message, the link configured to activate when the attachment is opened at the recipient to provide an indication that the attachment was opened at the recipient.

29. The system of claim 18, wherein the link is activated when the recipient clicks on the link.

30. The system of claim 29, wherein activating the link also causes information to be displayed to the recipient and to control the server to make a record of the information displayed.

31. The system of claim 30, wherein the information displayed contains a second link, the second link being activated when the recipient clicks on the second link, wherein activating the second link causes a second information to be displayed to the recipient and to control the server to make a record of the second information displayed.

32. A system transmitting a message from a sender to a recipient and providing an indication that the message was opened by the recipient, comprising:
- a server in electronic communication with the sender and the receiver, the server programmed to receive a message from the sender, to associate a link with the message, the link configured to execute when the link is activated at the recipient to provide an indication that the message has been delivered to a recipient, to transmit the message and the link from the server to the recipient, wherein
- the link is executed when the link is activated at the recipient to control the server to provide an indication that the message has been delivered to the recipient, and
- wherein the server is programmed to form an authenticatible information related to the message, and to transmit the indication of the delivery of the message to the recipient and the authenticatible information from the server to the sender.

33. The system of claim 32, wherein the link is activated by a server at the recipient.

34. The system of claim 33, wherein the link is automatically activated by the server at the recipient upon the first interaction of the link with the server at the recipient.

35. The system of claim 32, wherein the indication of the delivery of the message to the recipient, and the authenticatible information are stored in a memory.

36. The system of claim 32, wherein the link is activated by any servers encountered by the message as the message is relayed through a network when the message is transmitted from the server to the recipient.

37. The system of claim 36, wherein each activation of the link results in a record being made at the server of the activation of the link, and the server is programmed to store the record in a memory.

38. The system of claim 32, wherein the server associates the link or a different link with an attachment to the message, the link configured to activate when the attachment is opened at the recipient to provide an indication that the message was delivered to the recipient.

39. The system of claim 32, wherein the server associates the link or a different link with an attachment to the message, the link configured to activate when the attachment is opened at the recipient to provide an indication that the message was opened by the recipient.

40. The system of claim 32, wherein the link is activated when the recipient clicks on the link.

41. The system of claim 40, wherein activating the link also causes information to be displayed to the recipient and to control the server to make a record of the information displayed.

42. The system of claim 41, wherein the information displayed contains a second link, the second link being activated when the recipient clicks on the second link, wherein activating the second link causes a second information to be displayed to the recipient and to control the server to make a record of the second information displayed.

* * * * *

UNITED STATES PATENT AND TRADEMARK OFFICE
CERTIFICATE OF CORRECTION

PATENT NO. : 8,468,198 B2  Page 1 of 1
APPLICATION NO. : 13/448305
DATED : June 18, 2013
INVENTOR(S) : Terrance A. Tomkow It is certified that error appears in the above-identified patent and that said Letters Patent is hereby corrected as shown below:

In the Specification:

Column 1, line 15, between "their" and "Applicants" delete "entity." and insert instead --entirety.--.
line 39, between "Express®" and "and" delete "R".

Column 3, line 34, between "then" and "that" delete "verities" and insert instead --verified--.
line 53, between "a" and "within" delete "flan" and insert instead --flag--.

Column 18, line 12, between "RPOST" and "registers" delete "Sever" and insert instead --Server--.

Column 19, line 52, between "MX" and "for" delete "sever" and insert instead --server--.

Column 24, line 1, after "recipient(s);" delete "37".

Column 25, line 48, between "with" and "receipts." delete "e-mails" and insert instead --e-mail--.

Column 27, line 2, between "via" and "server" delete "SMPT" and insert instead --SMTP--.
line 34, between "using" and "Likewise," delete "SMPT." and insert instead --SMTP.--.

In the Claims:

Column 28, line 14, between "by" and "recipient" delete "a" and insert instead --the--.

Column 29, line 10, between "system" and "transmitting" insert --for--.
line 14, between "the" and "the" delete "receiver," and insert instead --recipient,--.

Column 30, line 7, between "system" and "transmitting" insert --for--.
line 11, between "the" and "the" delete "receiver," and insert instead --recipient,--.

Signed and Sealed this
First Day of April, 2014

Michelle K. Lee
*Deputy Director of the United States Patent and Trademark Office*